United States Patent
Lee et al.

(10) Patent No.: US 10,672,397 B2
(45) Date of Patent: *Jun. 2, 2020

(54) METHOD AND SYSTEM FOR FACILITATING A GUIDED DIALOG BETWEEN A USER AND A CONVERSATIONAL AGENT

(71) Applicant: Oath Inc., New York, NY (US)

(72) Inventors: Sungjin Lee, Edgewater, NJ (US); Amanda Stent, New York, NY (US)

(73) Assignee: Oath Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/522,864

(22) Filed: Jul. 26, 2019

(65) Prior Publication Data
US 2019/0348045 A1 Nov. 14, 2019

Related U.S. Application Data

(63) Continuation of application No. 15/260,596, filed on Sep. 9, 2016, now Pat. No. 10,403,273.

(51) Int. Cl.
*G10L 15/22* (2006.01)
*G10L 15/18* (2013.01)
*G06F 16/2452* (2019.01)
*G06F 16/332* (2019.01)
*G10L 15/06* (2013.01)

(52) U.S. Cl.
CPC ........ *G10L 15/22* (2013.01); *G06F 16/24522* (2019.01); *G06F 16/3329* (2019.01); *G10L 15/1822* (2013.01); *G10L 15/1815* (2013.01); *G10L 2015/0635* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 9,922,649 B1* | 3/2018 | LoRe | G10L 15/22 |
| 2004/0176953 A1* | 9/2004 | Coyle | G10L 15/22 |
| | | | 704/253 |
| 2005/0257174 A1* | 11/2005 | Wilson | G06F 3/0346 |
| | | | 715/863 |
| 2006/0149558 A1* | 7/2006 | Kahn | G10L 15/063 |
| | | | 704/278 |
| 2006/0200350 A1* | 9/2006 | Attwater | G10L 15/08 |
| | | | 704/251 |
| 2007/0094003 A1* | 4/2007 | Huang | G06F 17/279 |
| | | | 704/3 |

(Continued)

*Primary Examiner* — Thuykhanh Le
(74) *Attorney, Agent, or Firm* — Pillsbury Winthrop Shaw Pittman LLP

(57) ABSTRACT

The present teaching relates to facilitating a guided dialog with a user. In one example, an input utterance is obtained from the user. One or more task sets are estimated based on the input utterance. Each of the one or more task sets includes a plurality of tasks estimated to be requested by the user via the input utterance and is associated with a confidence score computed based on statistics with respect to the plurality of tasks in the task set. At least one of the one or more task sets is selected based on their respective confidence scores. A response is generated based on the tasks in the selected at least one task set. The response is provided to the user.

17 Claims, 16 Drawing Sheets

(56) References Cited

U.S. PATENT DOCUMENTS

| | | | |
|---|---|---|---|
| 2007/0094004 A1* | 4/2007 | Huang | G06F 17/279 704/3 |
| 2007/0094007 A1* | 4/2007 | Huang | G06F 17/2755 704/9 |
| 2008/0015864 A1 | 1/2008 | Ross et al. | |
| 2008/0084974 A1* | 4/2008 | Dhanakshirur | H04M 3/4936 379/88.18 |
| 2008/0222634 A1* | 9/2008 | Rustagi | G06F 9/5038 718/100 |
| 2009/0203438 A1* | 8/2009 | Okada | G06F 16/3329 463/30 |
| 2009/0204391 A1* | 8/2009 | Okada | G06F 16/3329 704/9 |
| 2009/0271193 A1* | 10/2009 | Miyamoto | G10L 15/22 704/235 |
| 2010/0198598 A1* | 8/2010 | Herbig | G10L 15/07 704/240 |
| 2011/0105190 A1* | 5/2011 | Cha | G10L 15/26 455/566 |
| 2011/0184730 A1* | 7/2011 | LeBeau | G10L 15/30 704/201 |
| 2011/0184735 A1* | 7/2011 | Flaks | G10L 17/00 704/240 |
| 2011/0196676 A1* | 8/2011 | Daye | G10L 17/04 704/244 |
| 2011/0288867 A1* | 11/2011 | Chengalvarayan | G10L 15/063 704/251 |
| 2011/0288868 A1 | 11/2011 | Lloyd et al. | |
| 2012/0265528 A1* | 10/2012 | Gruber | G10L 15/18 704/235 |
| 2013/0144622 A1* | 6/2013 | Yamada | G10L 25/48 704/248 |
| 2013/0173267 A1* | 7/2013 | Washio | G10L 15/22 704/240 |
| 2013/0325453 A1 | 12/2013 | Levien et al. | |
| 2014/0156276 A1 | 6/2014 | Nakano et al. | |
| 2015/0019074 A1* | 1/2015 | Winter | G10L 15/01 701/36 |
| 2015/0073789 A1* | 3/2015 | Hashimoto | G10L 15/265 704/235 |
| 2015/0127350 A1* | 5/2015 | Agiomyrgiannakis | G10L 13/02 704/266 |
| 2015/0348548 A1* | 12/2015 | Piernot | G06F 3/013 704/235 |
| 2016/0019465 A1* | 1/2016 | Milton | H04W 4/029 706/52 |
| 2016/0336024 A1* | 11/2016 | Choi | G10L 15/22 |
| 2016/0379632 A1* | 12/2016 | Hoffmeister | G10L 15/18 704/253 |
| 2017/0092366 A1* | 3/2017 | Hwang | G11C 16/10 |
| 2018/0012594 A1* | 1/2018 | Behzadi | G10L 15/14 |
| 2018/0075847 A1* | 3/2018 | Lee | G06F 16/24522 |

* cited by examiner

510

- The number of task frames in the parse
- The number of task frames in the parse conjoined with the agent's DA type
- The number of DAIs in the inactive task frame
- The pair of the total number of DAIs and the number of DAIs in the inactive task frame
- All possible pairs of delexicalized agent DAIs and delexicalized user DAIs in the inactive task frame
- All possible pairs of delexicalized user DAIs for each task frame
- The average confidence score of all DAIs assigned to active task frame †
- The average number of DAIs per active task frame†
- The conjunction of the number of DAIs assigned to active task frames and the number of active task frames
- The fraction of the number of gaps to the number of DAIs assigned to active task frames (a gap happens when two DAIs in the same task frame instance have an intermediate DAI in a different task frame instance)
- The entropy of DAI distribution across active task frames †
- The number of active task frames with only one DAI
- An indicator testing if the parse is the same as a heuristically initialized parse
- The degree of deviation of the parse from a heuristically initialized parse oin terms of the number of gaps †

FIG. 5

METHOD AND SYSTEM FOR FACILITATING A GUIDED DIALOG BETWEEN A USER AND A CONVERSATIONAL AGENT

CROSS-REFERENCE TO RELATED APPLICATIONS

The present application is a continuation of U.S. application Ser. No. 15/260,596, filed Sep. 9, 2016, entitled METHOD AND SYSTEM FOR FACILITATING A GUIDED DIALOG BETWEEN A USER AND A CONVERSATIONAL AGENT, which is incorporated herein by reference in its entirety.

BACKGROUND

1. Technical Field

The present teaching relates to methods, systems, and programming for Internet services. Particularly, the present teaching is directed to methods, systems, and programming for facilitating a guided dialog between a user and a conversational agent.

2. Discussion of Technical Background

The era of conversational agents has arrived: every major mobile operating system now comes with a conversational agent, which may be used to communicate with users. In addition, many businesses do not typically provide live chat customer support or service operators to assist their Internet customers. In such cases, a conversational agent, which may be an automated dialog bot or chatbot, might be used to communicate with customers. A chatbot may be a computer program designed to simulate an intelligent conversation with one or more human users via auditory or textual methods, for various practical purposes such as personalized service or information acquisition.

With the announcements of messaging-based conversational agent platforms from Microsoft, Google, Facebook and Kik (among others), current technology supports a rapid development and interconnection of many kinds of dialog bots. Despite this progress, current conversational agents can only handle a single task with a simple user goal at any particular moment. There are three significant hurdles to efficient, natural task-oriented interaction with current conversational agents. First, they lack the ability to share slot values across tasks. Due to the independent execution of domain-specific task scripts, information sharing across tasks is minimally supported—the user typically has to provide common slot values separately for each task. Second, current conversational agents lack the ability to express complex constraints on user goals—the user cannot communicate goals related to multiple tasks in a single utterance, and cannot provide multiple preferential constraints such as a Boolean expression over slot values. Third, current conversational agents lack the ability to interleave discussion of multiple related tasks. For instance, a current conversational agent can help a user find a restaurant, and then a hotel, without interleaving these tasks to manage shared constraints.

Therefore, there is a need to provide an improved solution for facilitating a guided dialog between a user and a conversational agent to solve the above-mentioned problems.

SUMMARY

The present teaching relates to methods, systems, and programming for Internet services. Particularly, the present teaching is directed to methods, systems, and programming for facilitating a guided dialog between a user and a conversational agent.

In one example, a method, implemented on a machine having at least one processor, storage, and a communication platform capable of connecting to a network for facilitating a guided dialog with a user is disclosed. An input utterance is obtained from the user. One or more task sets are estimated based on the input utterance. Each of the one or more task sets includes a plurality of tasks estimated to be requested by the user via the input utterance and is associated with a confidence score computed based on statistics with respect to the plurality of tasks in the task set. At least one of the one or more task sets is selected based on their respective confidence scores. A response is generated based on the tasks in the selected at least one task set. The response is provided to the user.

In a different example, a system having at least one processor, storage, and a communication platform capable of connecting to a network for facilitating a guided dialog with a user is disclosed. The system includes a semantic analyzer configured for obtaining an input utterance from the user; a task frame parser configured for determining one or more task sets estimated based on the input utterance, wherein each of the one or more task sets includes a plurality of tasks estimated to be requested by the user via the input utterance and is associated with a confidence score computed based on statistics with respect to the plurality of tasks in the task set; a dialog state updater configured for selecting at least one of the one or more task sets based on their respective confidence scores; and a response generator configured for generating a response based on the tasks in the selected at least one task set, and providing the response to the user.

Other concepts relate to software for implementing the present teaching on facilitating a guided dialog with a user. A software product, in accord with this concept, includes at least one machine-readable non-transitory medium and information carried by the medium. The information carried by the medium may be executable program code data, parameters in association with the executable program code, and/or information related to a user, a request, content, or information related to a social group, etc.

In one example, a machine-readable, non-transitory and tangible medium having information recorded thereon for facilitating a guided dialog with a user is disclosed. The information, when read by the machine, causes the machine to perform the following: obtaining an input utterance from the user; determining one or more task sets estimated based on the input utterance, wherein each of the one or more task sets includes a plurality of tasks estimated to be requested by the user via the input utterance and is associated with a confidence score computed based on statistics with respect to the plurality of tasks in the task set; selecting at least one of the one or more task sets based on their respective confidence scores; generating a response based on the tasks in the selected at least one task set; and providing the response to the user.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 illustrates exemplary features related to task frames for generating a statistical model to be used for calculating confidence scores with respect to estimated task frames, according to an embodiment of the present teaching;

DETAILED DESCRIPTION

Figure 1:
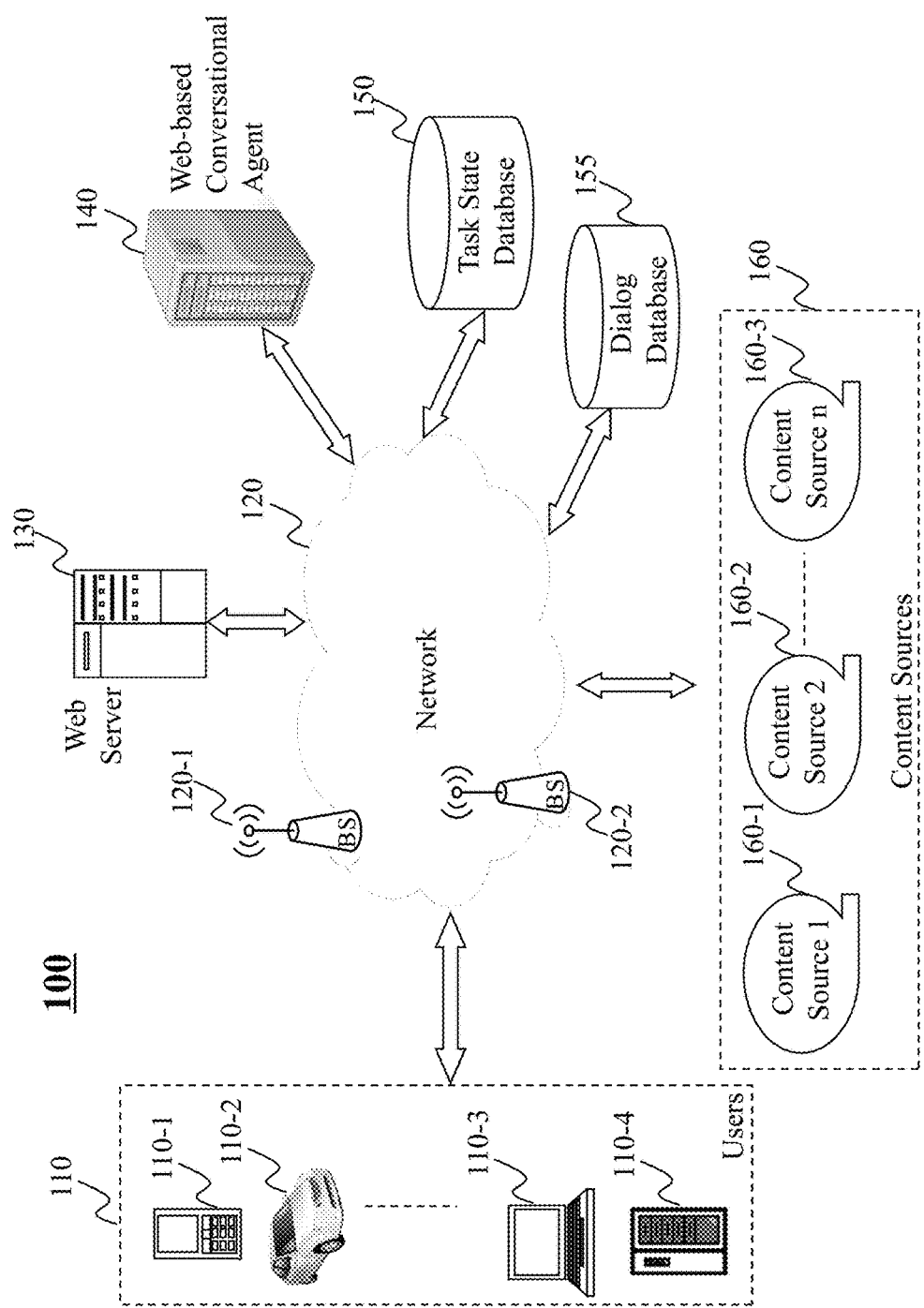
FIG. 1 is a high level depiction of an exemplary networked environment for facilitating online interactions between a conversional agent and an online user, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of facilitating a guided dialog between a user and a conversational agent. The method and system as disclosed herein aim at improving a user's dialog experience with a conversational agent. An interactive dialog, also known as a chat session, may begin between a user and the conversational agent. The chat session allows the user to receive answers to inquiries and receive information from the conversational agent.

In order to make interaction with conversational agents more natural and useful, it is essential for the agent to seamlessly orchestrate multiple domain-specific systems so that users can say things related to different domains in a single utterance, switch back and forth between different tasks without friction and express complex goals. For example, a complex goal may be "Thai or Indian but not Italian" in a task for finding a restaurant. The present disclosure describes a statistical dialog state tracking method that enables conversational agents to handle multi-domain, multitask continuous interaction with complex goals.

A conversational agent or an automated personal assistant may have the following basic functionalities: language understanding, in which the form of a user's input utterance is mapped to one or more semantic understandings; dialog management, in which the semantic understandings are added to the agent's dialog state based on understanding of the interaction and task with respect to the user so far, and in which the agent's next action is selected; and response generation, in which the agent's action (e.g. to ask a follow-up question to the user, to present a set of search results, to execute a task action, etc.) is realized.

Most conversational agents share a basic notion of a task frame, which includes a set of task fields, or slots, for which values must or may be specified in order to retrieve information to complete the task. For example, the task frame for a restaurant booking task will contain the required slots: date/time, location, and restaurant ID, with optional slots cuisine-type, ratings, cost-rating, etc. The task frame for a calendar booking task will contain required slots date/time and event name, with optional slots location, guests, description, etc.

The present disclosure describes a novel dialog manager and in particular a novel dialog state update step of dialog management. An input to the disclosed system is one or more semantic understandings that may be expressed as (task-slot: slot-value) pairs. There may be a set of domain-specific language understanding components each of which produces one or more semantic understandings. For example, given the user input "Italian please," a restaurant domain analyzer may construct an understanding of (cuisine-type: Italian), a museum finding domain analyzer may construct an understanding of (art-type: Italian), a local store domain analyzer may construct an understanding of (bakery-type: Italian), etc.

Given different semantic understanding results from multiple domain-specific systems, the disclosed conversational agent herein may generate a list of top N (partially complete) task frames with confidence scores that best represent the user's intent in this context. For example, given the user input "Italian please" as the first utterance in a conversation, the top task frames may be find-restaurant(cuisine-type: Italian) with confidence score 0.9 and find-museum(art-type: Italian) with confidence score 0.1. However, if the user previously said "I'd like to go to an art museum," and the agent responded "What type of art?," then the top task frames may be find-museum(art-type: Italian) with confidence score 0.9 and nothing else. The disclosed method may use the N best task frame sets to update the dialog state. In particular, it can: (1) find relevant frames which are already in previous dialog state; (2) share common slot values across the found task frames; and (3) update the dialog state based on the new task frames and inherited information. The newly updated dialog state can succinctly represent the current state of the conversation, including ambiguities, e.g. the agent not being sure if the user wants a restaurant or a museum, or not being sure if "Friday" indicates the start or end date of a trip). As such, the conversational agent may choose an action in the given situation.

The disclosed methods in the present teaching can transform conversational agents by adding human-like intelligence to: facilitate multi-task interaction, where the tasks may even be interleaved; manage slot-related uncertainty and redundancy in multi-task interaction; and manage task-related uncertainty in multi-task interaction.

For example, with the methods disclosed in the present teaching, a conversational agent could help a user book a complex vacation involving multiple hotels, restaurants, sight-seeing excursions and transportation options. Instead of requiring the user to mentally break down the vacation into single-task chunks, track sequencing of these chunks, and repeatedly supply information shared across chunks, such as the start and end times of each segment of the trip, the conversational agent could track this information, using statistical information it has gleaned from many prior conversations of this type, which enables a much more fluid and natural interaction.

The terms "conversational agent" and "agent" may be used interchangeably herein. The terms "dialog state" and "task state" may be used interchangeably herein.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

FIG. 1 is a high level depiction of an exemplary networked environment 100 for facilitating online interactions between a conversional agent and an online user, according to an embodiment of the present teaching. In FIG. 1, the exemplary networked environment 100 includes one or more users 110, a network 120, a web server 130, a web-based conversational agent 140, a task state database 150, a dialog database 155, and content sources 160. The network 120 may be a single network or a combination of different networks. For example, the network 120 may be a local area network (LAN), a wide area network (WAN), a public network, a private network, a proprietary network, a Public Telephone Switched Network (PSTN), the Internet, a wireless network, a virtual network, or any combination thereof. The network 120 may also include various network access points, e.g., wired or wireless access points such as base stations or Internet exchange points 120-1 . . . 120-2, through which a data source may connect to the network 120 in order to transmit information via the network 120.

Users 110 may be of different types such as users connected to the network 120 via desktop computers 110-4, laptop computers 110-3, a built-in device in a motor vehicle 110-2, or a mobile device 110-1. In one embodiment, users 110 may be connected to the network 120 and able to interact with the web server 130 and the web-based conversational agent 140 through wired or wireless technologies and related operating systems implemented within user-wearable devices (e.g., glasses, wrist watch, etc.).

A user, e.g., the user 110-1, may access a website provided by the web server 130 via the network 120 and communicate with the web-based conversational agent 140 via a user interface embedded on the website. It can be understood by one skilled in the art that while FIG. 1 describes a web-based conversational agent, the disclosed methods in the present teaching can also be applied on a conversational agent located on a local device of the user.

The web-based conversational agent 140 may communicate with the user to enable efficient, natural task-oriented interactions with the user, e.g. by a guided dialog with the user to determine the user's requests and tasks and take corresponding task actions accordingly. In one embodiment, the web-based conversational agent 140 may receive a request from the web server 130, or directly from the user, for starting an online dialog with the user. The online dialog, also known as a chat session, may allow the user to receive answers to inquiries and receive information from the web-based conversational agent 140. Based on a single input utterance from the user, the web-based conversational agent 140 may determine multiple tasks estimated to be requested by the user via the single input utterance. The tasks may share slot values parsed from the input utterance, such that the user does not need to repeat some information that can be inferred from the input utterance.

The web-based conversational agent 140 may store and access information stored in the dialog database 155 and the task state database 150 via the network 120. The information in the dialog database 155 and the task state database 150 may be generated by one or more different applications (not shown), which may be running on the web-based conversational agent 140, at the backend of the web-based conversational agent 140, or as a completely standalone system capable of connecting to the network 120, accessing information from different sources, analyzing the information, generating structured information, and storing such generated information in the dialog database 155 and the task state database 150.

The task state database 150 may include task states, e.g. in form of task lineages, of different users of the web-based conversational agent 140. The web-based conversational agent 140 may keep tracking the dialog state or task state of a user, by analyzing a newly input utterance from the user and updating the dialog state of the user based on the newly input utterance, e.g. by extending a dialog lineage of the user with newly estimated tasks requested by the user based on the newly input utterance.

The dialog database 155 may include various simulated dialogs for the web-based conversational agent 140 to use for communicating with users. The simulated dialogs may be generated based on real dialogs between users and human agents.

In one embodiment, the web-based conversational agent 140 may parse the input utterance to determine a plurality of dialog act items based on a semantic analysis of the input utterance. The web-based conversational agent 140 may then assign each of the plurality of dialog act items to a task frame candidate to generate a set of task frame candidates. Some of the plurality of dialog act items may be shared by two or more task frame candidates. The web-based conversational agent 140 may determine a task set that includes a plurality of tasks corresponding to the set of task frame candidates, and determine a task slot value for each of the plurality of dialog act items based on the assignment with respect to the set of task frame candidates. In one example, the web-based conversational agent 140 may determine multiple task sets in the manner described above, based on different assignments of the dialog act items. The web-based conversational agent 140 can calculate a confidence score associated with each task set, and select one or more task sets based on their respective confidence scores. Then, the web-based conversational agent 140 may generate and provide a response based on the tasks in the selected task set(s). In addition, the web-based conversational agent 140 may update a dialog state of the user based on the selected task set(s) obtained from the new input utterance.

The content sources 160 in the exemplary networked environment 100 include multiple content sources 160-1, 160-2 . . . 160-3. A content source 160 may correspond to a website hosted by an entity, whether an individual, a business, or an organization such as USPTO.gov, a content provider such as cnn.com and Yahoo.com, a social network website such as Facebook.com, or a content feed source such as tweeter or blogs. The web server 130 may access information from any of the content sources 160-1, 160-2 . . . 160-3. For example, the web server 130 may fetch content, e.g., websites, through its web crawler to build a search index.

Figure 2:
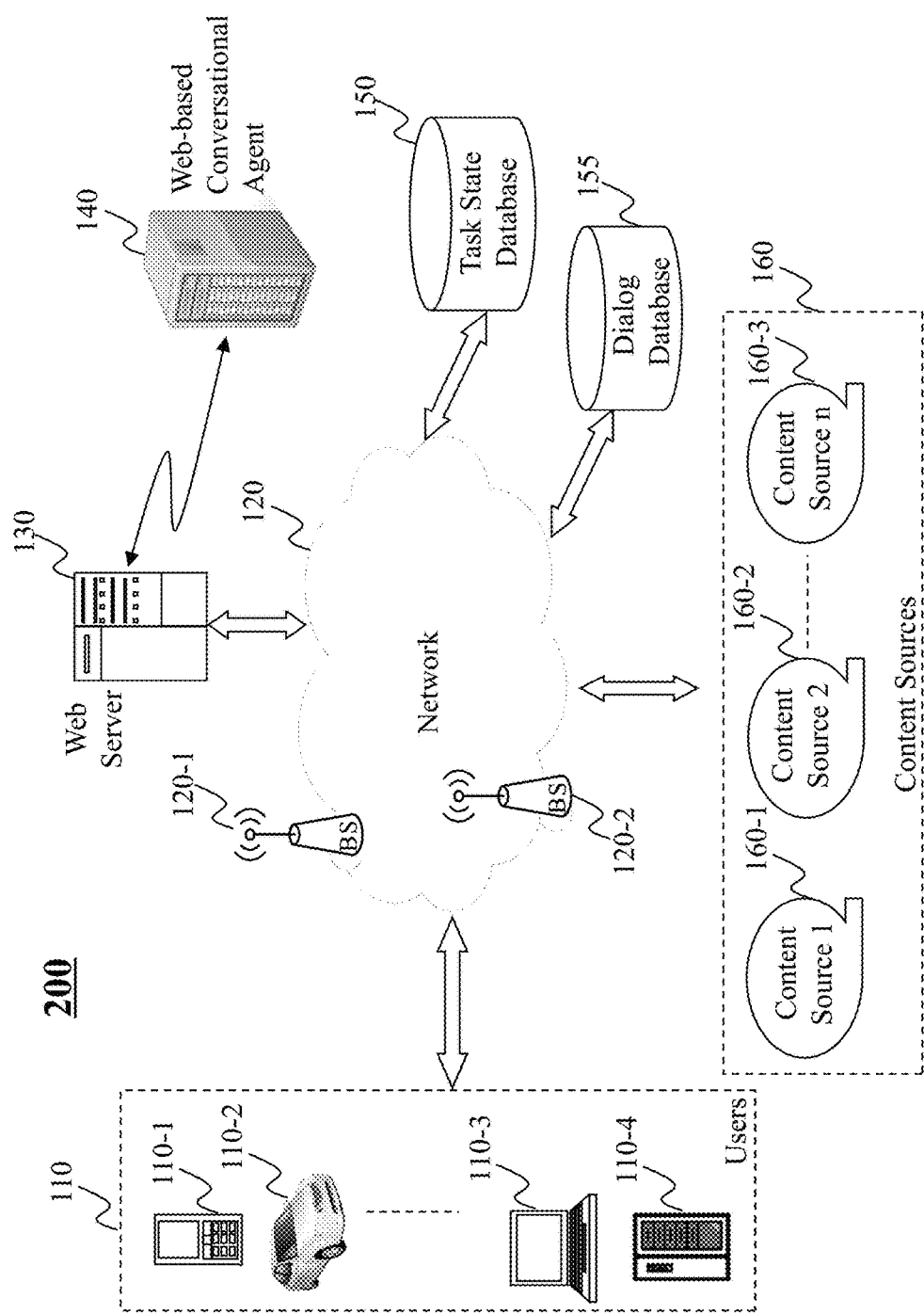
FIG. 2 is a high level depiction of another exemplary networked environment for facilitating online interactions between a conversional agent and an online user, according to an embodiment of the present teaching.

FIG. 2 is a high level depiction of another exemplary networked environment 200 for facilitating online interactions between a conversational agent and an online user, according to an embodiment of the present teaching. The exemplary networked environment 200 in this embodiment is similar to the exemplary networked environment 100 in FIG. 1, except that the web-based conversational agent 140 serves as a backend system for the web server 130.

Figure 3:
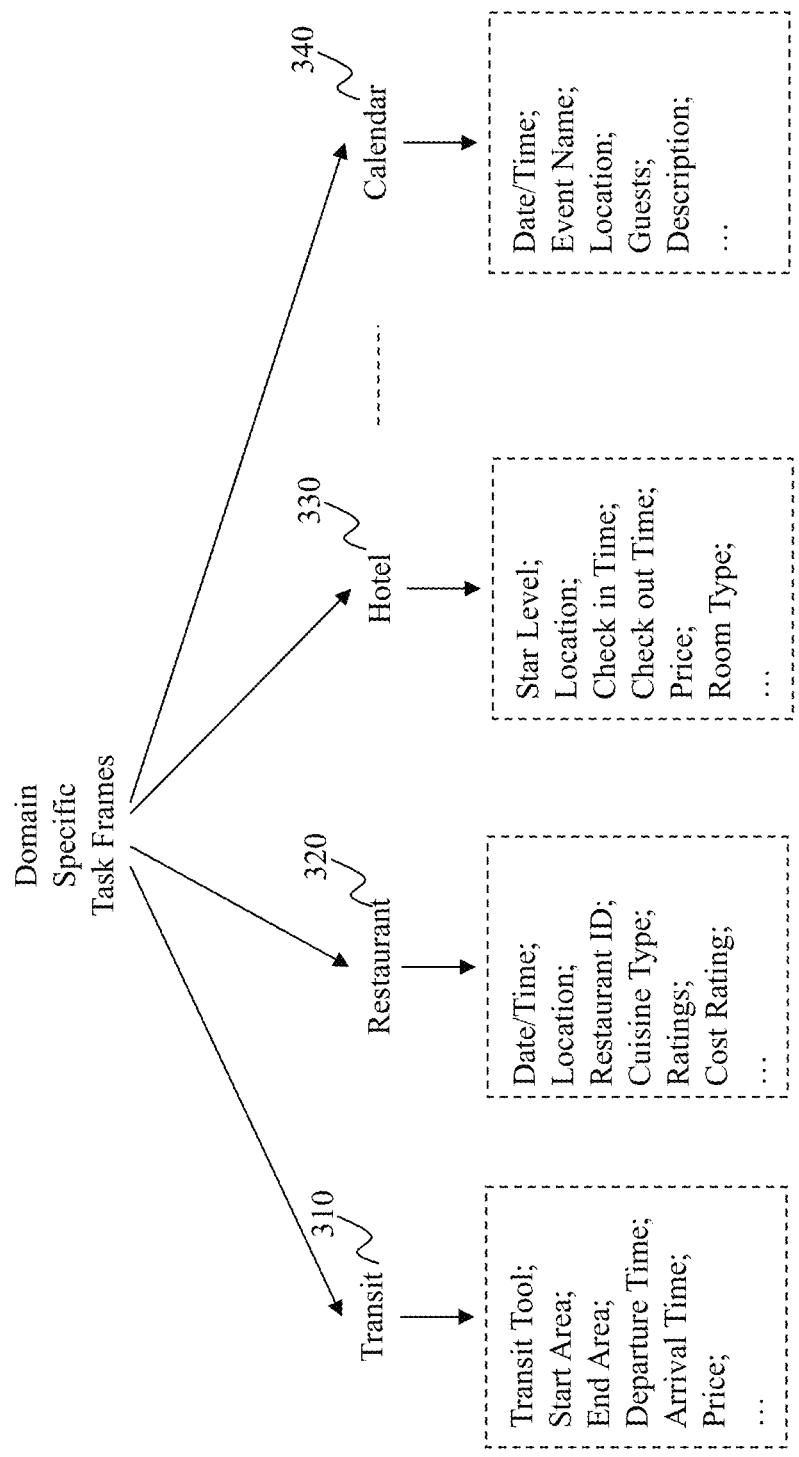
FIG. 3 illustrates various exemplary domain specific task frames, according to an embodiment of the present teaching.

FIG. 3 illustrates various exemplary domain specific task frames, according to an embodiment of the present teaching. A task frame includes a set of task fields, or slots, for which values may be specified in order to retrieve information to complete the task. For example, as shown in FIG. 3, a transit task frame 310 may include slots: transit tool, start area, end area, departure time, arrival time, price, etc.; a restaurant task frame 320 may include slots: date/time, location, restaurant ID, cuisine type, ratings, cost rating, etc.; a hotel task frame 330 may include slots: star level, location, check in time, check out time, price, room type, etc.; and a calendar task frame 340 may include slots: date/time, event name, location, guests, description, etc. In a task frame, some of the slots may be required while some of the slots may be optional.

In one embodiment, the web-based conversational agent 140 may parse an input utterance to identify possible slots that can be assigned to multiple task frames, such that multiple tasks can be determined and handled with a single input utterance from a user. When some task frame identified misses one or more slots after the parsing of the input utterance, the web-based conversational agent 140 may either infer them based on other task frames in the input utterance or ask follow-up questions to the user.

Figure 4:
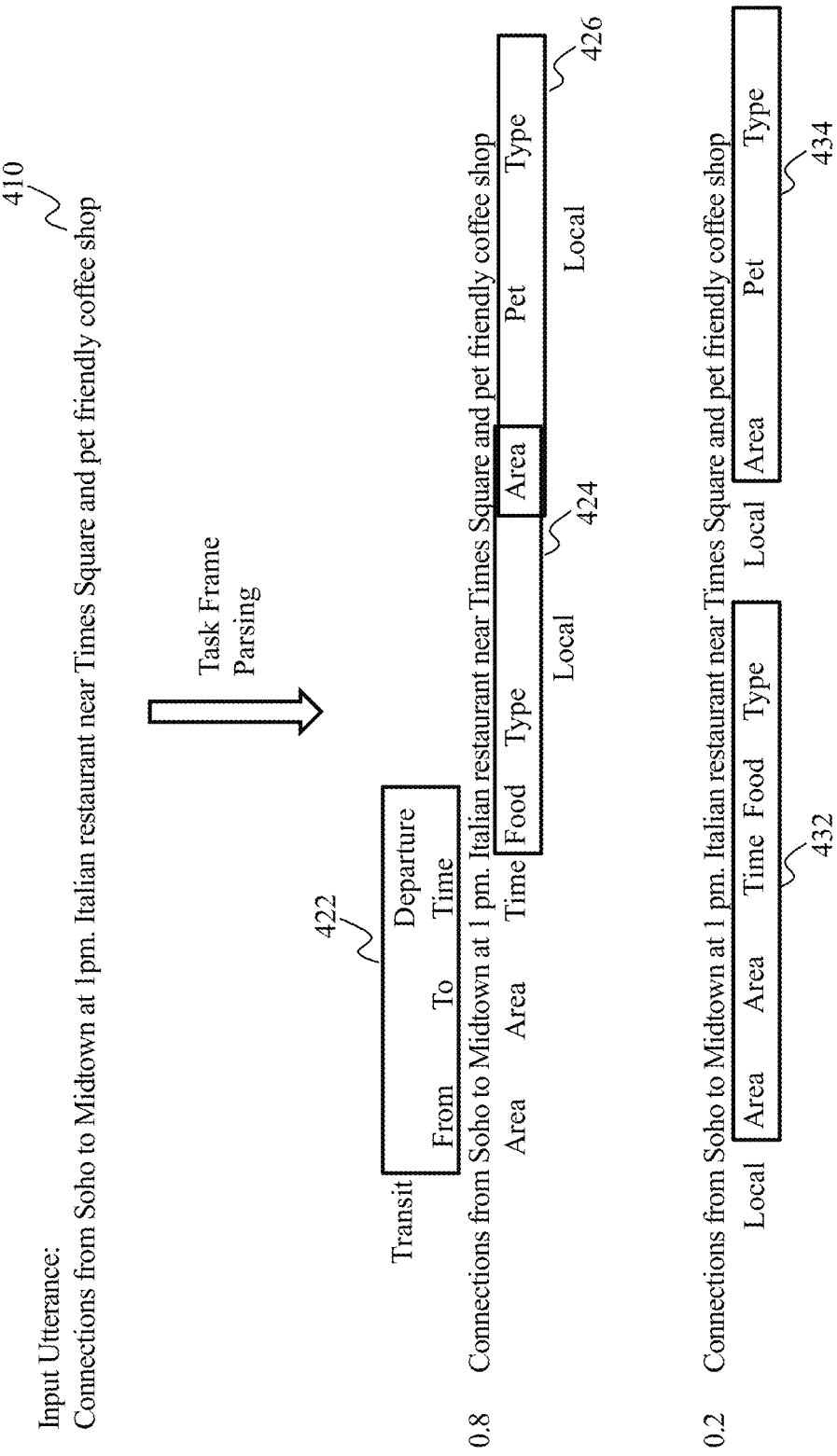
FIG. 4 illustrates an exemplary task frame parsing of an exemplary input utterance from a user, according to an embodiment of the present teaching.

FIG. 4 illustrates an exemplary task frame parsing of an exemplary input utterance from a user, according to an embodiment of the present teaching. In order to scale out conversation agents in domains, a distributed architecture may be used, where a user input is sent out to multiple domain-specific language understanding agents each of which returns possibly conflicting interpretations. For instance, FIG. 4 shows two possible interpretation results for a user input utterance 410 "Connections from Soho to Midtown at 1 pm. Italian restaurant near Times Square and pet friendly coffee shop." This may be spoken by a user when having a dialog with the web-based conversational agent 140. There are two possible tasks in this example-Transit (providing transit information) and Local (finding local places)—which tag a set of text spans with relevant slots (e.g. Soho tagged as From in Transit and Area in Local, respectively).

Based on the input utterance 410, the web-based conversational agent 140 can perform task frame parsing to determine two possible task sets. The first possible task set includes three tasks: transit 422, local restaurant 424; and local coffee shop 426. The second possible task set includes two tasks: local restaurant 432 and local coffee shop 434.

The goal of task frame parsing is to generate a coherent set of task frames (indicated as boxes in FIG. 4) by selecting task frames from the available set and associating their slots to the most appropriate text spans. For example, the first parse in FIG. 4 has one Transit task frame and two Local task frames whereas the second parse has only two Local task frames. The web-based conversational agent 140 should assign confidence score to parses according to statistical models learned from data. A correct assignment of task frames can be done by a dialog manager in a conversational agent, since it requires access to the dialog context (i.e. the history of interactions with this user, the physical context of the interaction, etc.). Depending on the user input and the dialog context, the system may decide to assign complex-valued slot values (e.g. "1 p.m. or 2 p.m.") or to share slot values across multiple task frames (the time may be shared across Local and Transit frames). The disclosed method here may frame task frame parsing as graphical model-based inference.

As can be seen in FIG. 4, a dialog act item "Times Square" is shared by two task frames 424 and 426. In addition, a new task set may be generated by reassigning a dialog act item from one task frame to another. For example, while the dialog act item "1 pm" in the input utterance is assigned to the transit task 422 in the first task set, it is assigned to the local restaurant task 432 in the second task set. In general, after starting with a heuristically initialized parse, the web-based conversational agent 140 may draw a sample of task sets by randomly moving a single dialog act item from one task frame to another, until the maximum number of samples has been reached.

Each possible task set may be associated with a confidence score. The first task set has a confidence score of 0.8 while the second task set has a confidence score of 0.2. A confidence score for a task set can represent a level of confidence the web-based conversational agent 140 has in this task set. The confidence score can be calculated based on a model that is trained with features related to task frames.

FIG. 5 illustrates exemplary features related to task frames for generating a statistical model to be used for calculating confidence scores with respect to estimated task frames, according to an embodiment of the present teaching. The features 510 shown in FIG. 5 are all sparse binary features except those marked with "†".

Figure 6:
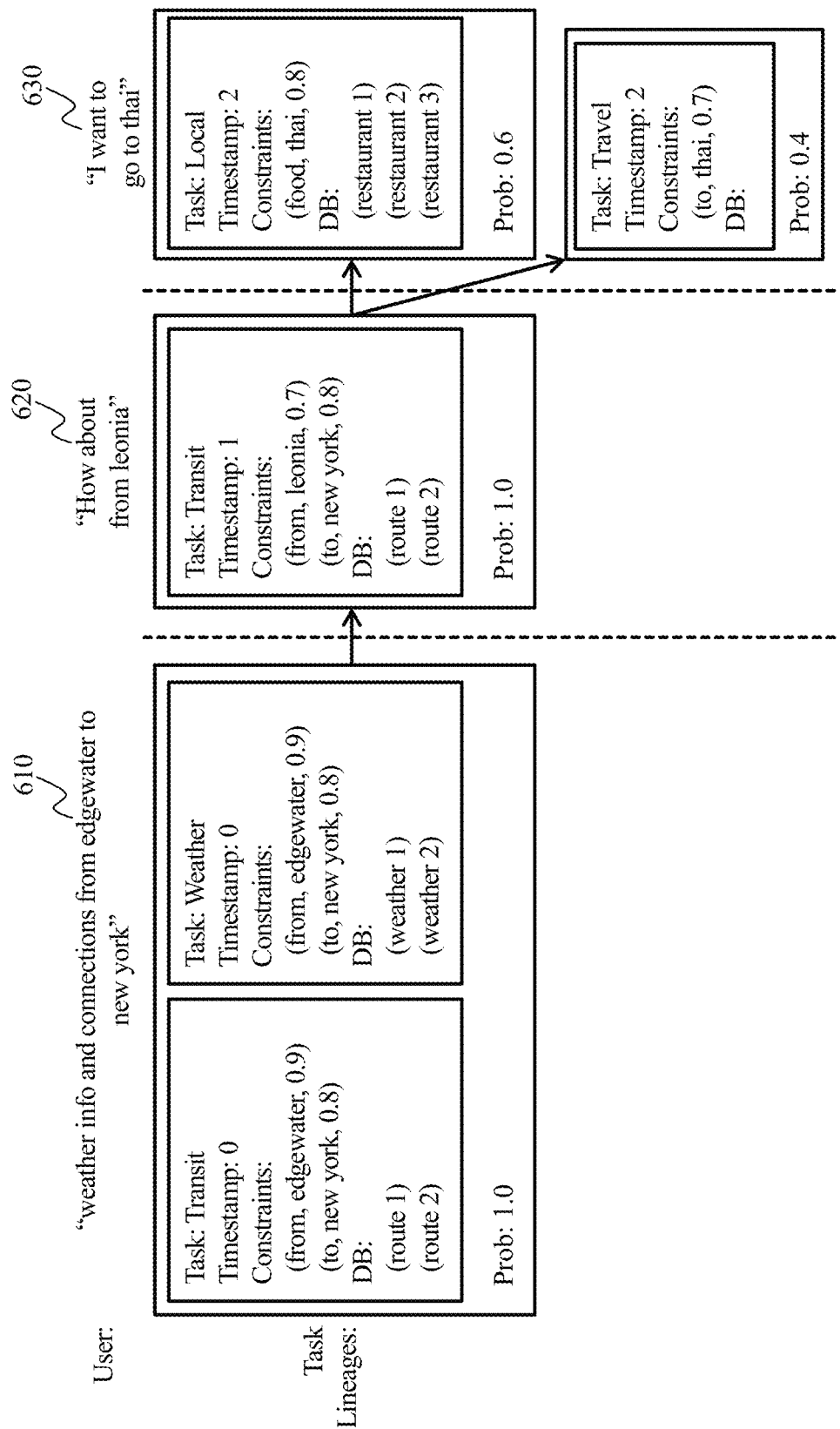
FIG. 6 illustrates an extension and tracking of task lineages of a user during a guided dialog with a conversational agent, according to an embodiment of the present teaching.

FIG. 6 illustrates an extension and tracking of task lineages of a user during a guided dialog with a conversational agent, according to an embodiment of the present teaching. The disclosed method may represent the dialog state as a list of N best task lineages with associated confidence scores. A task lineage should provide crucial pieces of information for conversation structure. For instance, the most recent task frames in a lineage can serve as the current focus of conversation. In addition, when a user switches back to a previous task, the system can trace back the lineage in reverse order to take recency into account. However, conversational agents often cannot determine exactly what the user's task is. For example, there may be speech recognition or language understanding errors, or genuine ambiguities ("1 p.m." could be either a start time or an end time). Due to the prevalent uncertainty in perception and interpretation, the system maintains a list of possible task lineages. For instance, FIG. 6 illustrates the development process of task lineages as utterances come from a user.

Given a list of task frame sets from task frame parsing, the disclosed system in the present teaching constructs a new set of task lineages by extending previous task lineages with each task frame set. For each extended task frame, the system updates the states of each slot based on not only the slot values in the new task frame but also the related information found in the task lineage. There are many algorithms for slot-level state update, for example a variety of algorithms from the recent Dialog State Tracking Challenges. Once the internal update of each task is done, the confidence scores over the new set of task lineages can be estimated based on the coherence features between the previous task lineage and the new task lineage.

As shown in FIG. 6, a task lineage starts when a user inputs "weather info and connections from edgewater to new York" 610. At this phase, the web-based conversational agent 140 determines with a probability 1 that the user requests two tasks: a transit task and a weather task, both at timestamp 0. Both tasks are involved with two constraints: (from, edgewater, 0.9) and (to, new york, 0.8), that are estimated based on parsing of the input 610 and some features listed in FIG. 5. The transit task may be performed to return two results: (route 1) and (route 2) from a database. The weather task may be performed to return two results: (weather 1) and (weather 2) from a database. Here, the web-based conversational agent 140 is sure that the user is requesting two tasks at the same time, and therefore generates responses to the two tasks together. The web-based conversational agent 140 may provide the results of the two tasks to the user at the end of this phase.

At the next phase of timestamp 1, the user provides an input utterance "how about from leonia" 620. This input utterance may be provided by the user after he/she receives the (route 1) and (route 2) provided by the web-based conversational agent 140 at timestamp 0. The web-based conversational agent 140 may then determine with a probability 1 that the user requests a transit task with two constraints: (from, leonia, 0.7) and (to, new york, 0.8). This may be determined based on parsing of the input utterance 620 and some features listed in FIG. 5, as well as the previous tasks in the task lineage, i.e. the task information obtained at timestamp 0. For example, based on the previous transit task "from edgewater to new york" at timestamp 0, the web-based conversational agent 140 may determine that the user means a new transit task "from leonia to new york" when the user provides the new input utterance "how about from leonia" 620.

The transit task may be performed to return two results: (route 1) and (route 2) from a database. Here, the web-based conversational agent 140 is sure that the user is requesting the transit task and provides the results to the user at the end of this phase.

At the next phase of timestamp 2, the user provides an input utterance "I want to go to thai" 630. The web-based conversational agent 140 may then determine two possible tasks: a local restaurant task with a probability 0.6 and a travel task with a probability 0.4, because there is ambiguity about the intent of the user. The user may want to go to the country Thailand or may want to go to a restaurant of Thailand food. The local restaurant task has a constraint (food, thai, 0.8) and three results (restaurant 1), (restaurant 2), (restaurant 3) in the database that are matching the constraint. The travel task has a constraint (to, thai, 0.7) and no result matching this constraint in the database. The constraints may be determined based on parsing of the input utterance 630 and some features listed in FIG. 5, as well as the previous tasks in the task lineage, i.e. the task information obtained at timestamp 0 and timestamp 1. For example, based on the previous transit tasks "from edgewater to new york" at timestamp 0 and "from leonia to new york" at timestamp 1, the web-based conversational agent 140 may estimate with a low probability 0.4 that the user's intent at timestamp 2 is a travel task "to Thailand". This probability may be even lower when timestamp 1 and timestamp 2 are very close in time, because it is unlikely for the user to change mind about a transit task so fast.

In general, a confidence score in a constraint of a task may be independent of the probability of that task. For example, the confidence score 0.7 in the constraint (to, thai, 0.7) may be independent of the probability 0.4 of the task travel, because what confidence score 0.7 means is that given that the intent of the user is indeed about a travel, how confident the web-based conversational agent 140 is to determine the destination of the travel to be Thailand.

The web-based conversational agent 140 may then provide the results of the three matched restaurants to the user at the end of this phase. At this phase, there are two task lineages: one ending with task local restaurant and the other ending with task travel. In future timestamps, the web-based conversational agent 140 will keep track of the two task lineages together, until one of them is closed with probability 0. For example, if the user selects one of the three restaurants, the web-based conversational agent 140 may update the local restaurant task with probability 1 and update the travel task with probability 0; if the user inputs "I do not want a restaurant, but want to go to the country Thailand", the web-based conversational agent 140 may update the local restaurant task with probability 0 and update the travel task with probability 1.

The confidence scores referred to in these methods are typically obtained by training on logs of previous interactions with an (actual or simulated) dialog system, as in the dialog state tracking challenges. Common methods for training include minimizing negative log likelihood of log linear or neural network models.

After the update process is done, the system prunes task lineages below the top N lineages. Then, it can use the current set of task lineages to decide what to do next. If there is an ambiguity it can ask a clarification question about a slot or task ("Do you want to leave at 1 p.m. or arrive at 1 p.m.?", "Do you want to go to a museum or a restaurant?"). If there is an issue with retrieving relevant results, it can propose slot value relaxation ("There are no Italian restaurants in Soho. What about the Village?"). In addition, it can track the uncertainty until it is resolved naturally through the dialog, just as a human would.

Figure 7:
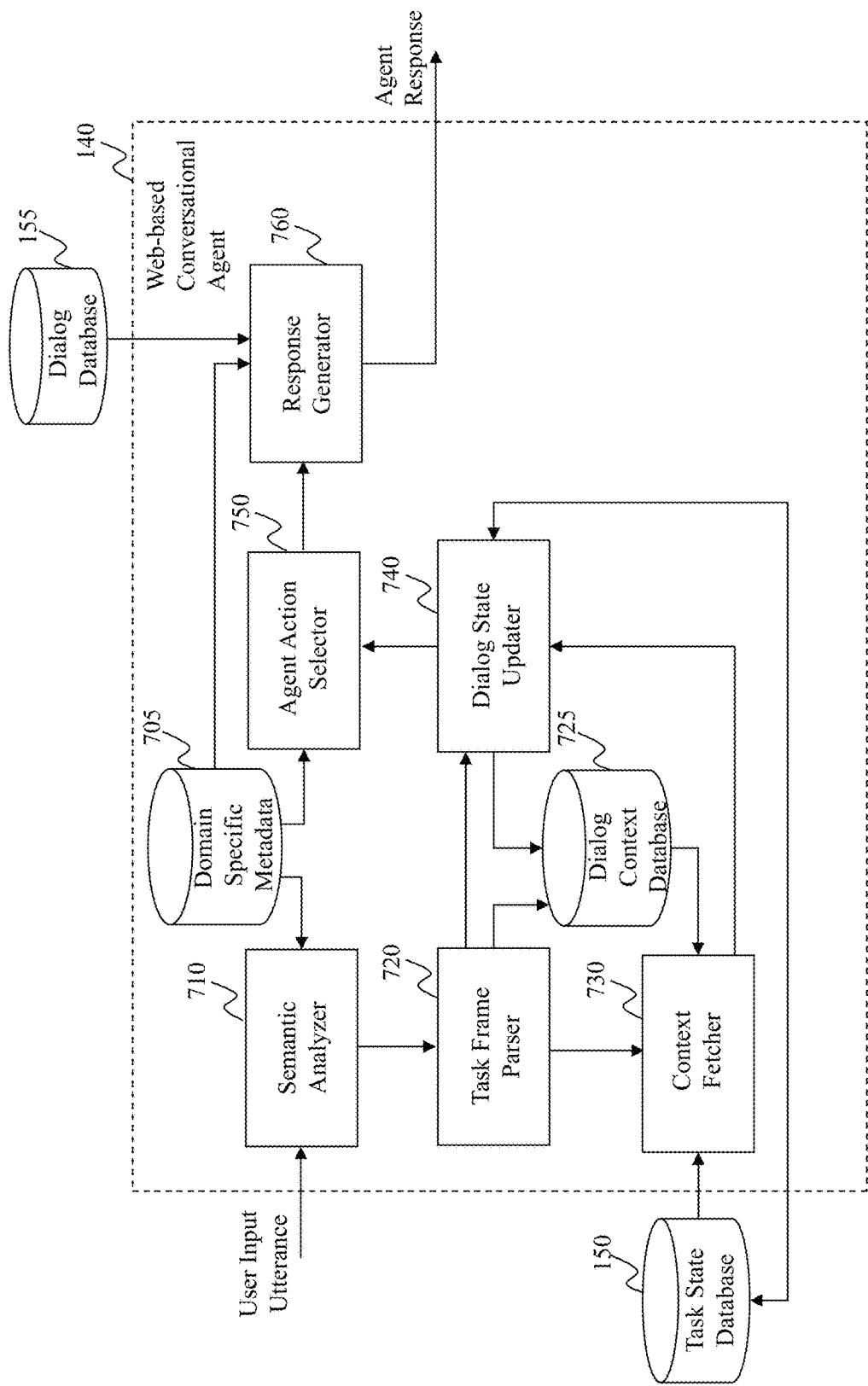
FIG. 7 illustrates an exemplary diagram of a web-based conversational agent, according to an embodiment of the present teaching.

FIG. 7 illustrates an exemplary diagram of a web-based conversational agent 140, according to an embodiment of the present teaching. The web-based conversational agent 140 in this example includes a semantic analyzer 710, a task frame parser 720, a domain specific metadata 705, a dialog context database 725, a context fetcher 730, a dialog state updater 740, an agent action selector 750, and a response generator 760.

The semantic analyzer 710 in this example may receive a user input utterance from the web server 130 or directly from a user. The input utterance may be either in form of an auditory utterance or a text utterance that is generated based on a transcription of an auditory input. The semantic analyzer 710 may analyze the input utterance to semantically understand the language in the input utterance. During the analysis, the semantic analyzer 710 may make use of different domain specific metadata 705 to generate one or more different semantic understandings. The semantic analyzer 710 may send the one or more different semantic understandings to the task frame parser 720 for task frame parsing.

The task frame parser 720 in this example may receive the semantics analysis results from the semantic analyzer 710 and parse the input utterance to identify possible task frames. In one embodiment, the task frame parser 720 may parse the input utterance to determine a plurality of dialog act items. For example, "Times Square" in FIG. 4 is a dialog act item in the input utterance 410.

The task frame parser 720 may then assign each of the plurality of dialog act items to a task frame candidate to generate a set of task frame candidates. Some of the plurality of dialog act items may be shared by two or more task frame candidates. For example, the "Times Square" in FIG. 4 is shared by two task frames 424 and 426.

The task frame parser 720 may determine a task set that includes a plurality of tasks corresponding to the set of task frame candidates, and determine a task slot value for each of the plurality of dialog act items based on the assignment with respect to the set of task frame candidates. In one example, the task frame parser 720 may determine multiple task sets in the manner described above, based on different assignments of the dialog act items. The task frame parser 720 can calculate a confidence score associated with each task set, and select one or more task sets based on their respective confidence scores. For example, there are two possible task sets in FIG. 4, determined based on the input utterance 410, with confidence scores 0.8 and 0.2 respectively.

The goal of task frame parsing may be to generate a coherent set of task frames by selecting task frames from the available set and associating their slots to the most appropriate text spans. Depending on the user input and the dialog context, the task frame parser 720 may decide to assign complex-valued slot values (e.g. "1 p.m. or 2 p.m.") or to share slot values across multiple task frames.

The task frame parser 720 may store the task frames in the selected task sets into the dialog context database 725, as context information with respect to the dialog and the user. The task frame parser 720 may also send the task frames in the selected task sets, with their respective confidence scores, to the context fetcher 730 for fetching context information and to the dialog state updater 740 for updating dialog states.

The context fetcher 730 in this example may obtain task frame information from the task frame parser 720 in a current time slot and retrieving task states, e.g. in form of task lineages, in previous time slots with respect to the user from the task state database 150. The context fetcher 730 may fetch relevant context information from the dialog context database 725 based on the previous task states and the current task frames. In one embodiment, the context fetcher 730 may also obtain agent output and determine which elements from the context sets to fetch based on the agent output. The context sets in the dialog context database 725 may include dialog contexts like the history of interactions with this user, the physical context of the interaction, etc. The context fetcher 730 may send the fetched relevant context information to the dialog state updater 740 for updating dialog states with respect to the user.

The dialog state updater 740 in this example may obtain task frames parsed by the task frame parser 720 with their respective confidence scores and obtain relevant context information from the context fetcher 730. Based on the task frames with their respective confidence scores and the relevant context information, the dialog state updater 740 can determine current task states for the user. The dialog state updater 740 may then update the dialog state for the user, e.g. by generating updated or extended task lineages for the user as shown in FIG. 5.

Given a list of task frame sets from task frame parsing, the dialog state updater 740 may construct a new set of task lineages by extending previous task lineages with each task frame set. For each extended task frame, the dialog state updater 740 may update the states of each slot based on not only the slot values in the new task frame but also the related information found in the task lineage. Once the internal update of each task is done, the confidence scores over the new set of task lineages can be estimated based on the coherence features between the previous task lineage and the new task lineage. The dialog state updater 740 may then update the task lineages in the task state database 150 and send the updated task dialog state to the agent action selector 750 for selecting an agent action.

The agent action selector 750 in this example may select an agent action corresponding to each task in accordance with the updated task dialog state. The agent action selector 750 may use the current set of task lineages to select the next action for the conversational agent. The next action may be asking follow up questions, giving recommendations, or returning results according to requested tasks, etc. The next action may be determined based on the domain specific metadata 705. The agent action selector 750 may send the selected agent action to the response generator 760

The response generator 760 in this example may generate a response in accordance with the selected agent action. The response may be generated based on the dialog database 155, which includes various simulated dialogs that may be generated based on real dialogs between users and human agents. The response generator 760 may send the generated response to the web server 130 or to the user directly.

Figure 8:
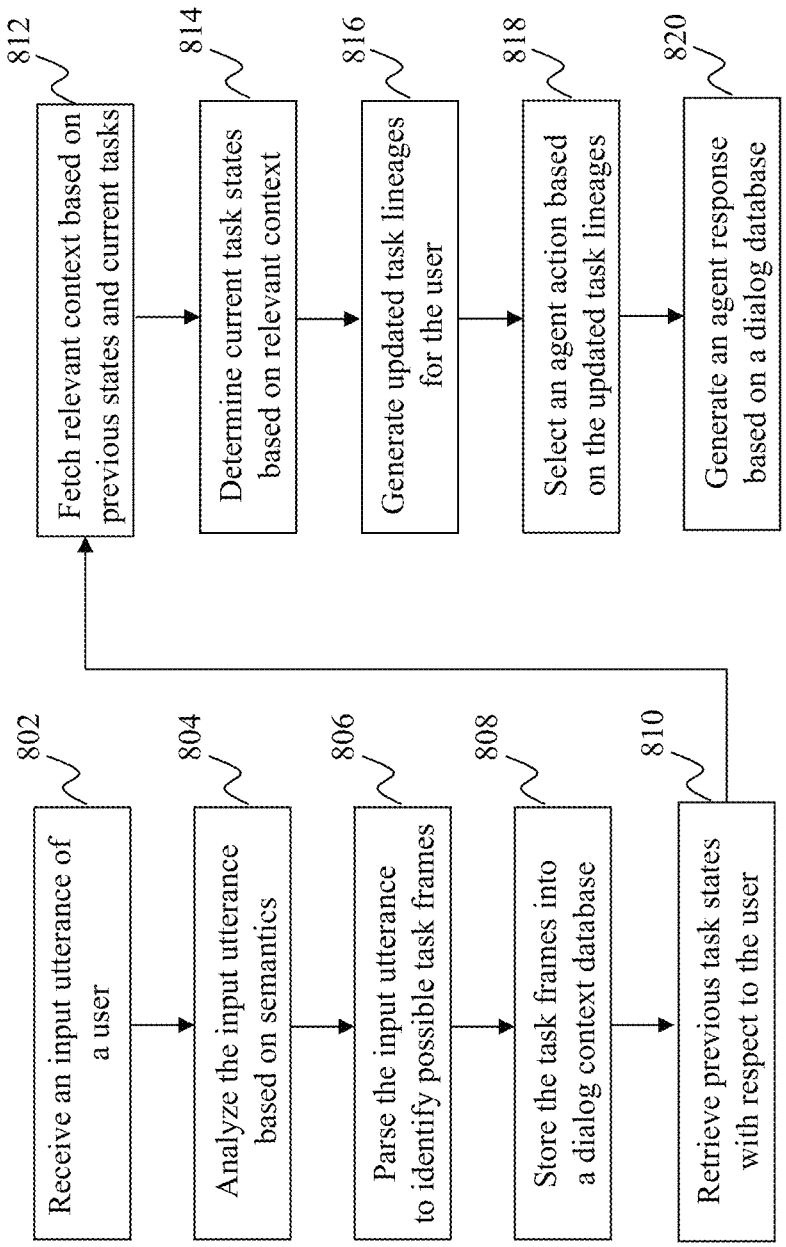
FIG. 8 is a flowchart of an exemplary process performed by a web-based conversational agent, according to an embodiment of the present teaching.

FIG. 8 is a flowchart of an exemplary process performed by a web-based conversational agent, e.g. the web-based conversational agent 140 in FIG. 7, according to an embodiment of the present teaching. An input utterance of a user is received at 802. The input utterance is analyzed at 804 based on semantics. At 806, the input utterance is parsed to identify possible task frames. The task frames are stored into a dialog context database at 808. At 810, previous task states with respect to the user are retrieved.

Relevant context information is fetched at 812 based on the previous task states and the currently identified task frames. At 814, current task states are determined based on the relevant context information and the current identified task frames. Updated task lineages are generated at 816. An agent action is then selected at 818 based on the updated task lineages. At 820, an agent response is generated and provided based on a dialog database.

Figure 9:
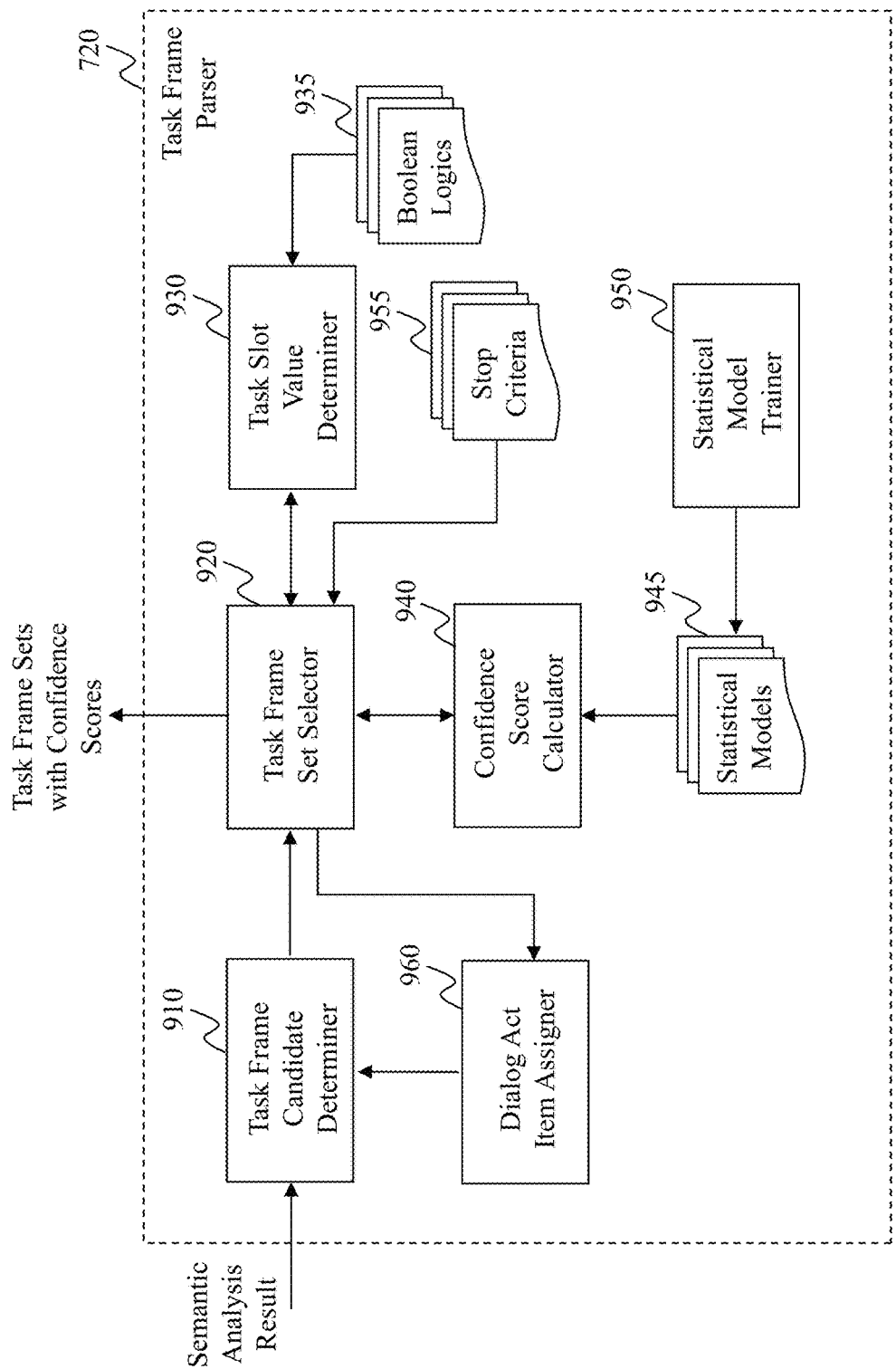
FIG. 9 illustrates an exemplary diagram of a task frame parser, according to an embodiment of the present teaching.

FIG. 9 illustrates an exemplary diagram of a task frame parser 720, e.g. the task frame parser 720 in FIG. 7, according to an embodiment of the present teaching. The task frame parser 720 in this example includes a task frame candidate determiner 910, a task frame set selector 920, a task slot value determiner 930, Boolean logics 935, a confidence score calculator 940, statistical models 945, a statistical model trainer 950, stop criteria 955, and a dialog act item assigner 960.

The task frame candidate determiner 910 in this example may obtain a semantic analysis result that is generated based on an input utterance from a user, and identify possible task frame candidates from the semantic-based input utterance. The task frame candidate determiner 910 may determine each possible task frame candidate by determining one or more dialog act items in the input utterance, e.g. by looking up a set of task schemas in a knowledge base that defines which dialog act item can possibly belong to which task frame. The task frame candidate determiner 910 may send the task frame candidates to the task frame set selector 920.

The task frame set selector 920 in this example may determine and select one or more task frame sets based on the task frames obtained from the task frame candidate determiner 910. In one embodiment, the task frame set selector 920 may send each task frame to the task slot value determiner 930 for determining task slot values of the task frame.

The task slot value determiner 930 in this example may incorporate some Boolean logics 935 to determine complex valued slots. For example, the task slot value determiner 930 can determine a complex valued slot for (cuisine type: Thai or Indian but not Italian) in a task for finding a restaurant. This can give a user more flexibility when having a dialog with the conversational agent. After determining a value for each task slot in each task frame, the task slot value determiner 930 may send the valued slots to the task frame set selector 920 for task frame set selection.

The confidence score calculator 940 in this example may calculate a confidence score for each possible task frame set obtained from the task frame set selector 920. The calculation may be based on a statistical model selected from the statistical models 945. Each statistical model is trained by the statistical model trainer 950, based on features related to task frames, e.g. the features shown in FIG. 5. The confidence score calculator 940 may select one of the statistical models 945 based on user information of the user, e.g. demographic information, past online history of the user, etc. Based on the selected model, the confidence score calculator 940 may calculate a confidence score for each task set. The confidence score for a task set can represent a level of confidence the conversational agent has in this task set. The confidence score may be in form of a probability number, an integer, etc. The confidence score calculator 940 can send the calculated confidence scores to the task frame set selector 920 for task frame set selection.

The statistical model trainer 950 in this example may train the statistical models 945 based on task frame features that are updated periodically and store the statistical models 945 at the conversational agent.

After obtaining the task slot values from the task slot value determiner 930 and the confidence scores from the confidence score calculator 940, the task frame set selector 920 may determine whether any of the stop criteria 955 are satisfied. A stop criterion may be based on a maximum number of samples or iterations for the task frame set selector 920 to determine possible task frame sets. When the stop criterion is satisfied, the task frame set selector 920 does not need to generate any more possible task frame sets, and may select and provide one or more task frame sets from generated task frame sets. The task frame set selector 920 may send each selected task frame set with a corresponding confidence score, for context fetching and/or dialog state update. When no stop criterion is satisfied, the task frame set selector 920 may inform the dialog act item assigner 960 to reassign dialog act items for generating new task frames.

The dialog act item assigner 960 in this example may assign each of the dialog act items in the input utterance to a task frame candidate to generate a set of task frame candidates at the task frame candidate determiner 910. Some of the dialog act items may be shared by two or more task frame candidates. Upon request from the task frame set selector 920, the dialog act item assigner 960 may reassign one or more dialog act items to different task frame candidates to generate new task frame sets. Once the task frame candidate determiner 910 can determine and provide new task frame sets to the task frame set selector 920, the task frame set selector 920 may have more task frame sets to select and provide. The stop criterion may be dynamically set up by the system.

Independent assignment of dialog act items to task frames may result in parses that violates pre-determined rules. In one embodiment, to generate a K-best list of legitimate parses, the conversational agent can adopt a beam search technique using the Monte Carlo Markov Chain (MCMC) inference with simulated annealing (SA) as listed in the following Algorithm, Algorithm: MCMC-SA Beam Parsing. After starting with a heuristically initialized parse, the algorithm draws a sample by randomly moving a single dialog act item from one task frame to another so as not to produce an illegal parse, until the maximum number of samples M has been reached.

---

Algorithm: MCMC-SA Beam Parsing

Input: $K > 0$, $M > 0$, $\tilde{u}$, $p_\theta$ from Eq. 1

Result: $\mathcal{H} = [(\hat{A}_{\tilde{u}}^1, s^1), \ldots, (\hat{A}_{\tilde{u}}^K, s^K)]$, a $K$-best list of assignments with scores $A_{\tilde{u}} \leftarrow \text{initialize}(\tilde{u})$, $s \leftarrow p_\theta(A_{\tilde{u}} | \tilde{u})$;

insert_and_sort($\mathcal{H}$, $A_{\tilde{u}}$, $s$);

$c \leftarrow 0$, acc_rate $\leftarrow 1$ :

while $c < M$ do $\quad \hat{A}_{\tilde{u}}, \tilde{s} \leftarrow \text{random\_choice}(\mathcal{H})$;

$\quad A_{\tilde{u}} \leftarrow \text{sample}(\hat{A}_{\tilde{u}})$, $s \leftarrow p_\theta(A_{\tilde{u}} | \tilde{u})$;

$\quad$ if $s > \tilde{s}$ or $\text{random}(0, 1) < \text{acc\_rate}$ then $\quad \quad |$ insert_and_sort($\mathcal{H}$, $A_{\tilde{u}}$, $s$);

$\quad$ end $\quad c \leftarrow c + 1$, acc_rate $\leftarrow$ acc_rate $- \frac{1}{M}$;

end return $\mathcal{H}$

---

In the above Algorithm, $\tilde{u}$ represents a set of dialog act items parsed from an input utterance; $A_{\tilde{u}}^k$ represents an assignment of the dialog act items into task frames; and $s^k$ represents a confidence score associated with $A_{\tilde{u}}^k$. At a particular turn, given $\tilde{u}$, the aim of task frame parsing is to return K-best list of assignments $A_{\tilde{u}}^k, k \in \{1, \ldots, K\}$ according to the following conditional log-linear model:

$$p_\theta(\mathcal{A}_{\tilde{u}} | \tilde{u}) = \frac{\exp\theta^T g(\mathcal{A}_{\tilde{u}}, \tilde{u})}{\sum_{\mathcal{A}'_{\tilde{u}}} \exp\theta^T g(\mathcal{A}'_{\tilde{u}}, \tilde{u})} \quad (1)$$

where θ are the model weights, and g is a vector-valued feature function. The exact computation of Eq. 1 above can become very costly for a complicated user input due to the normalization term. The above Algorithm can avoid the exponential time complexity to yield a K-best list of parses which are used to approximate the sum in the normalization term. The parameter θ in Eq. 1 can be optimized by maximizing the log-likelihood of the correct parse based on some training data comprising spoken language understanding results-parse pairs ($\tilde{u}^{(i)}, A_{\tilde{u}}^{(i)}$), with a pre-feature stochastic gradient. The features for training the parameter θ may include one or more of the features in FIG. 5.

Figure 10:
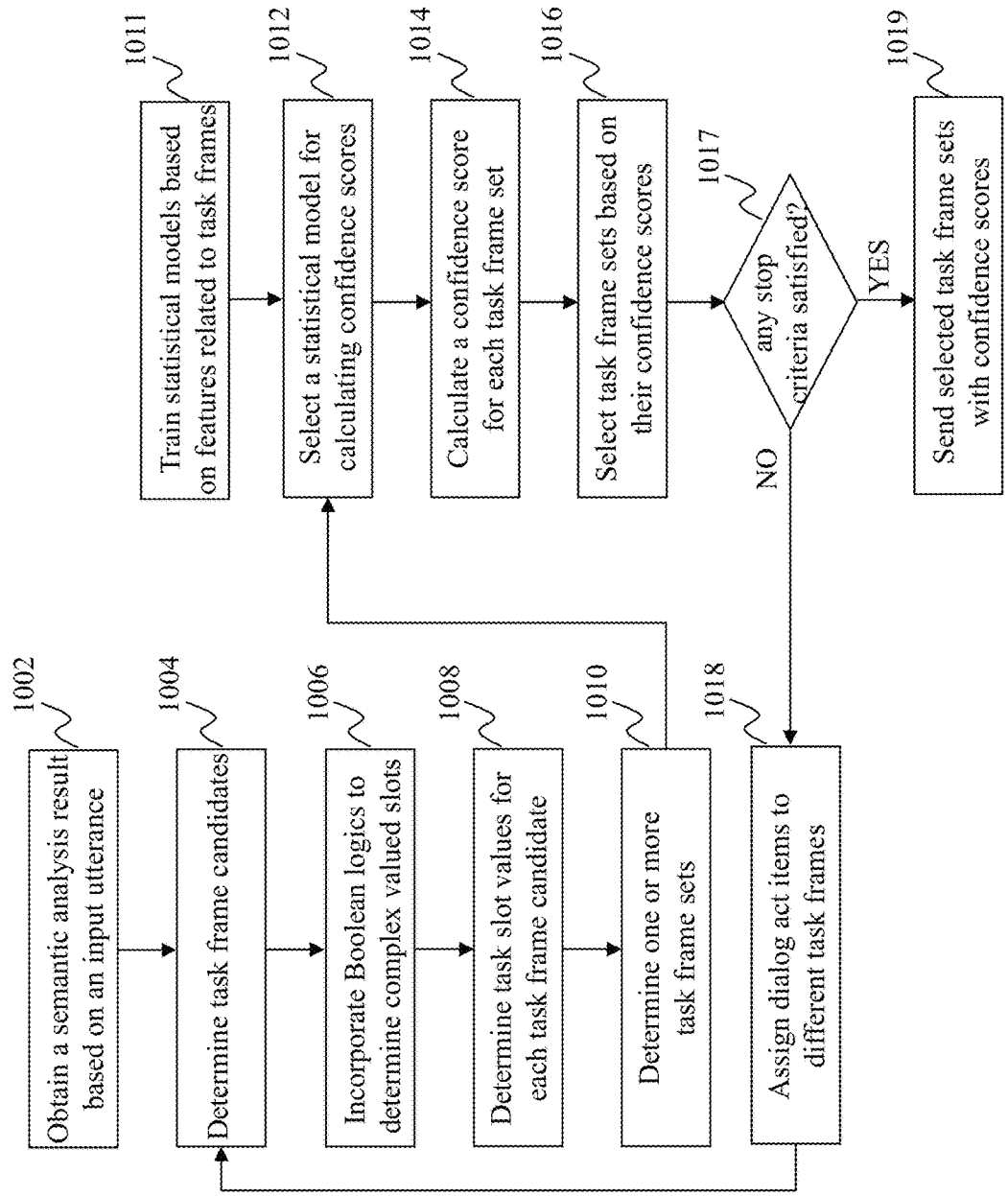
FIG. 10 is a flowchart of an exemplary process performed by a task frame parser, according to an embodiment of the present teaching.

FIG. 10 is a flowchart of an exemplary process performed by a task frame parser, e.g. the task frame parser 720 in FIG. 9, according to an embodiment of the present teaching. A semantic analysis result is obtained at 1002 based on an input utterance. Task frame candidates are determined at 1004. Boolean logics are incorporated at 1006 to determine complex valued slots. At 1008, task slot values are determined for each task frame candidate. One or more task frame sets are determined at 1010. The process may then proceed to 1012.

At 1011, statistical models are trained based on features related to task frames. Then at 1012, a statistical model is selected for calculating confidence scores. A confidence score is calculated at 1014 for each task frame set. One or more task frame sets are selected at 1016 based on their respective confidence scores. At 1017, it is determined whether any stop criteria are satisfied. If so, the process moves to 1019 for sending selected task frame sets with confidence scores. If not, the process moves to 1018 for (re)assigning dialog act items to different task frames and then moves back to 1004.

Figure 11:
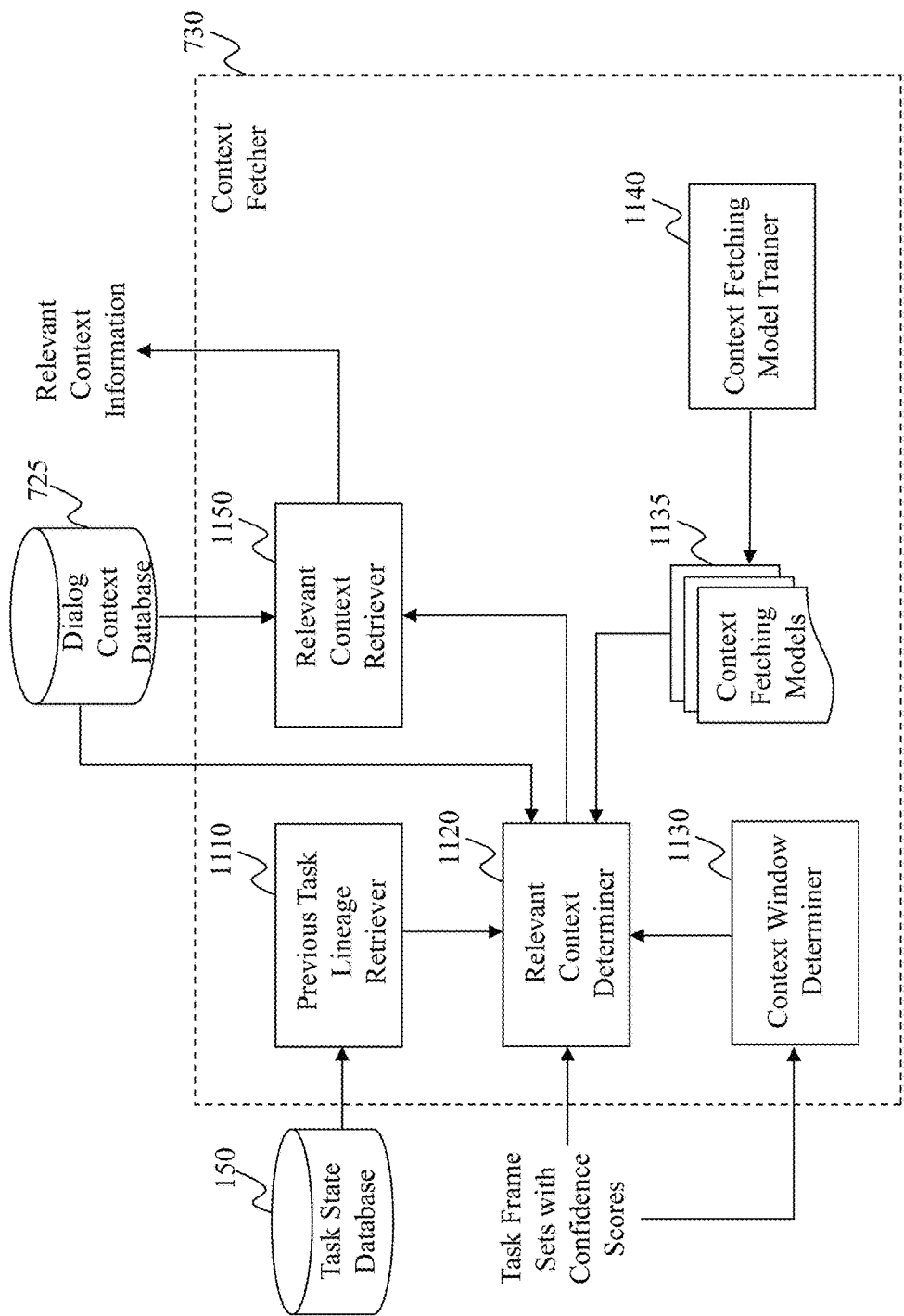
FIG. 11 illustrates an exemplary diagram of a context fetcher, according to an embodiment of the present teaching.

FIG. 11 illustrates an exemplary diagram of a context fetcher 730, according to an embodiment of the present teaching. The context fetcher 730 in this example includes a previous task lineage retriever 1110, a relevant context determiner 1120, a context window determiner 1130, context fetching models 1135, a context fetching model trainer 1140, and a relevant context retriever 1150.

The previous task lineage retriever 1110 in this example may retrieve previous task lineages of the user from the task state database 150, and send the retrieved previous task lineages to the relevant context determiner 1120 for determining relevant context information.

The relevant context determiner 1120 in this example may obtain the retrieved previous task lineages from the previous task lineage retriever 1110 and obtain task frame sets with confidence scores from the task frame parser 720. The relevant context determiner 1120 may determine relevant context information based on the retrieved previous task lineages and the task frame sets determined from a current input utterance. In one embodiment, the relevant context determiner 1120 may also obtain agent output and determine which elements from the context sets are relevant contexts to fetch based on the agent output as well.

The determination of relevant context information at the relevant context determiner 1120 may be a context fetching model. In one embodiment, the relevant context determiner 1120 may select one of the context fetching models 1135, e.g. based on user information of the user. The context fetching model trainer 1140 in this example may train or generate the context fetching models 1135 based on context related features, either periodically or upon request.

Based on the selected context fetching model, the relevant context determiner 1120 may determine the relevant context information to be retrieved from the dialog context database 725, in accordance with a context window determined by the context window determiner 1130. The context window determiner 1130 in this example may determine the context window based on the task frame sets with confidence scores obtained from the task frame parser 720. The context window may indicate a time window within which relevant contexts should be considered for fetching.

The relevant context determiner 1120 may send the determination to the relevant context retriever 1150. The relevant context retriever 1150 in this example may retrieve the relevant context information determined by the relevant context determiner 1120 and provide the retrieved relevant context information for dialog state update.

Figure 12:
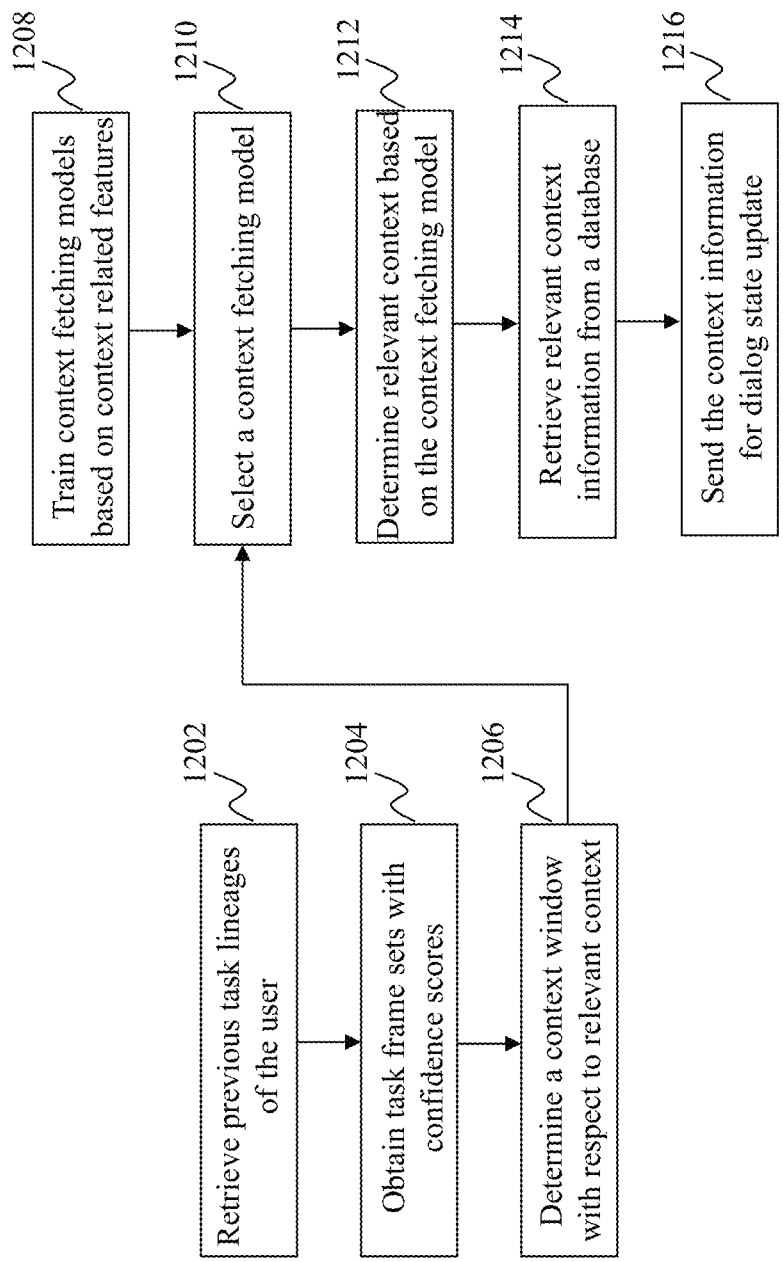
FIG. 12 is a flowchart of an exemplary process performed by a context fetcher, according to an embodiment of the present teaching.

FIG. 12 is a flowchart of an exemplary process performed by a context fetcher, e.g. the context fetcher 730 in FIG. 11, according to an embodiment of the present teaching. Previous task lineages of the user are retrieved at 1202. Task frame sets are obtained at 1204 with confidence scores. A context window is determined at 1206 with respect to relevant context to be fetched. The process may then move to 1210.

At 1208, context fetching models are trained based on context related features. Then at 1210, a context fetching model is selected. Relevant context information is determined at 1212 based on the context fetching model. At 1214, the relevant context information is retrieved from a database. The retrieved relevant context information is sent at 1216 for dialog state update.

Figure 13:
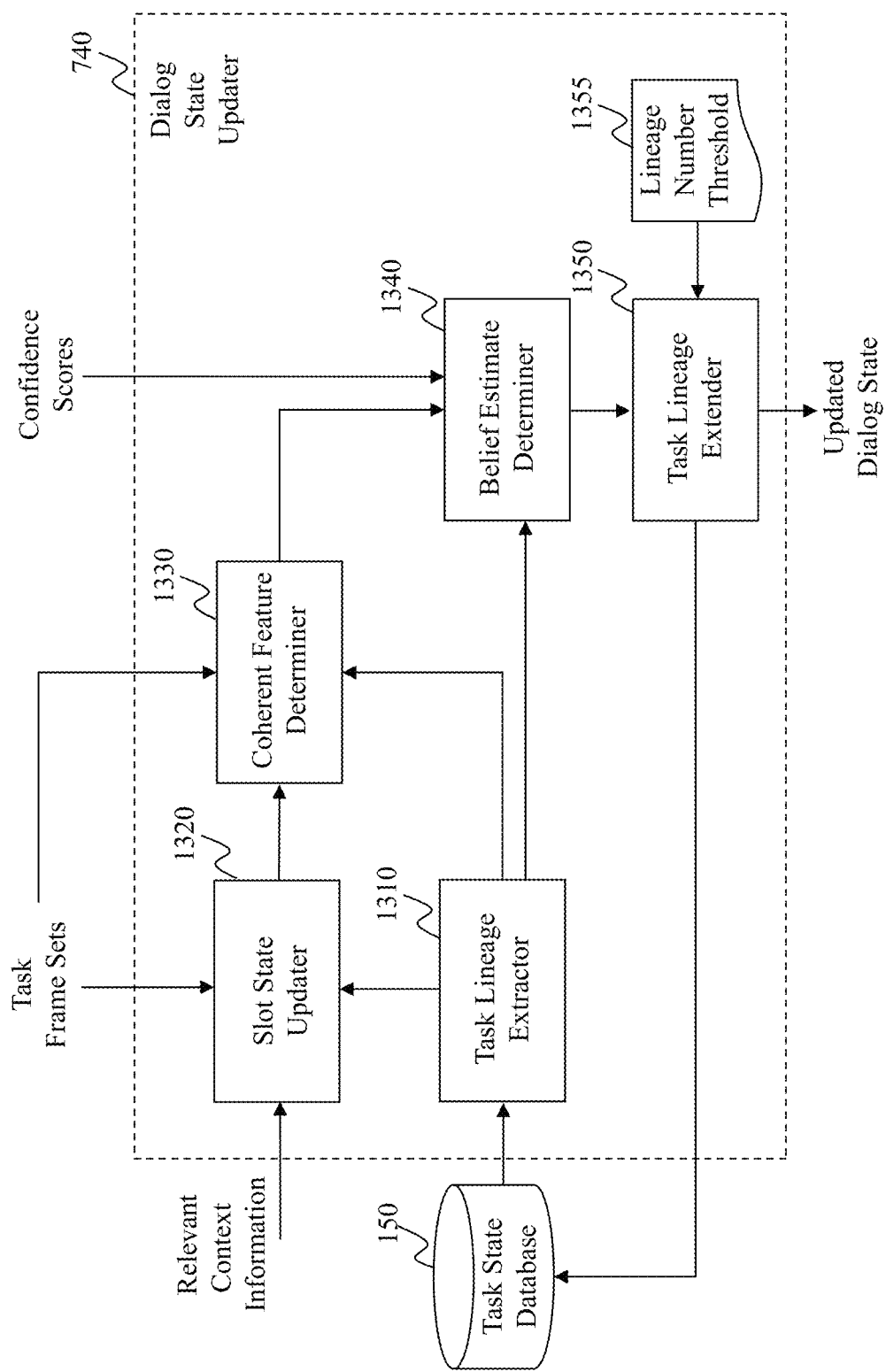
FIG. 13 illustrates an exemplary diagram of a dialog state updater, according to an embodiment of the present teaching.

FIG. 13 illustrates an exemplary diagram of a dialog state updater 740, according to an embodiment of the present teaching. The dialog state updater 740 in this example includes a task lineage extractor 1310, a slot state updater 1320, a coherent feature determiner 1330, a belief estimate determiner 1340, a task lineage extender 1350, and a lineage number threshold 1355.

The task lineage extractor 1310 in this example may extract task lineages of the user from the task state database 150. In one embodiment, the task lineage extractor 1310 may be the same as the previous task lineage retriever 1110 in the context fetcher 730. After obtaining the existing task lineages of the user, the task lineage extractor 1310 may send the existing task lineages of the user to the slot state updater 1320 for updating slot states, to the coherent feature determiner 1330 for determining coherent features, and to the belief estimate determiner 1340 for determining belief estimates.

The slot state updater 1320 in this example may obtain current task frame sets with respect to the user from the task frame parser 720, obtain relevant context information from the context fetcher 730, and obtain the existing task lineages of the user from the task lineage extractor 1310. Based on the existing task lineages, the current task frame sets and the relevant context information with respect to the user, the slot state updater 1320 may update states of each slot of the task lineages and generate a new task lineage. The slot state updater 1320 may send both the existing task lineages and the new task lineage to the coherent feature determiner 1330 for determining their coherent features.

The coherent feature determiner 1330 in this example may obtain new and existing task lineages, and the task frame sets from the current input utterance. The coherent feature determiner 1330 may determine coherent features between the previous task lineage and the new task lineage. The coherent feature determiner 1330 may send the coherent features to the belief estimate determiner 1340 to determine belief estimates for each new set of task lineages.

The belief estimate determiner 1340 in this example may obtain the previous task lineages from the task lineage extractor 1310, obtain the confidence scores for each task frame set in current input utterance from the task frame parser 720, and obtain the coherent features between the previous task lineage and each new task lineage from the coherent feature determiner 1330. A belief estimate for each new task lineage represents a level of belief for the new task lineage to represent correct intent of the user. For example, in FIG. 6, the belief estimates for task lineages at each phase is represented by a probability number at the bottom of each box. The belief estimate determiner 1340 may determine a belief estimate for each new task lineage based on the coherent features and the confidence scores of current task frame sets. For example, in FIG. 6, both task frame sets include the local coffee shop task 426, 434. Therefore, the belief estimate determiner 1340 may give a belief estimate of probability 1 (0.8+0.2) for the user to request a pet friendly coffee shop near Times Square, as shown in FIG. 6.

The task lineage extender 1350 in this example may extend the existing task lineages of the user with the new task lineages, e.g. by adding current task frame sets with top confidence scores to each existing task lineage. In one embodiment, the task lineage extender 1350 may retrieve the lineage number threshold 1355 to determine whether the extended task lineages exceed the lineage number threshold 1355. If so, the task lineage extender 1350 may keep just the extended task lineages of a number equal to the lineage number threshold 1355 with top belief estimates. After updating dialog state by extending the task lineages, the task lineage extender 1350 may store the updated dialog state in the task state database 150 and/or send the updated dialog state to the agent action selector 750 for selecting next actions of the conversational agent.

Figure 14:
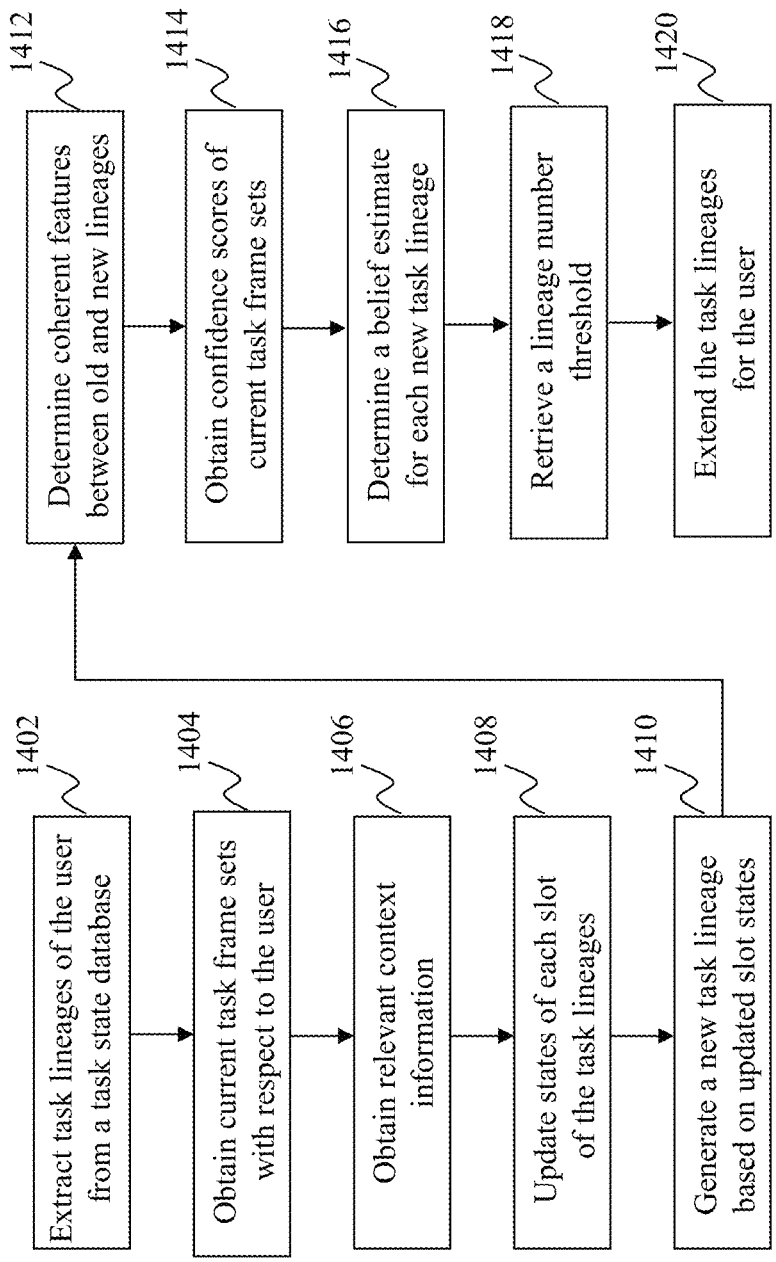
FIG. 14 is a flowchart of an exemplary process performed by a dialog state updater, according to an embodiment of the present teaching.

FIG. 14 is a flowchart of an exemplary process performed by a dialog state updater, e.g. the dialog state updater 740 in FIG. 13, according to an embodiment of the present teaching. Task lineages of the user are extracted at 1402 from a task state database. Current task frame sets are obtained at 1404 with respect to the user. Relevant context information is obtained at 1406. At 1408, states of each slot of the task lineages are updated. A new task lineage is generated at 1410 based on the updated slot states.

Coherent features are determined at 1412 between previous and new task lineages. Confidence scores of current task frame sets are obtained at 1414. At 1416, a belief estimate is determined for each new task lineage. A lineage number threshold is retrieved at 1418. At 1420, the previous task lineages of the user are extended.

It can be understood that the order of the steps shown in FIGS. 8, 10, 12 and 14 may be changed according to different embodiments of the present teaching.

Figure 15:
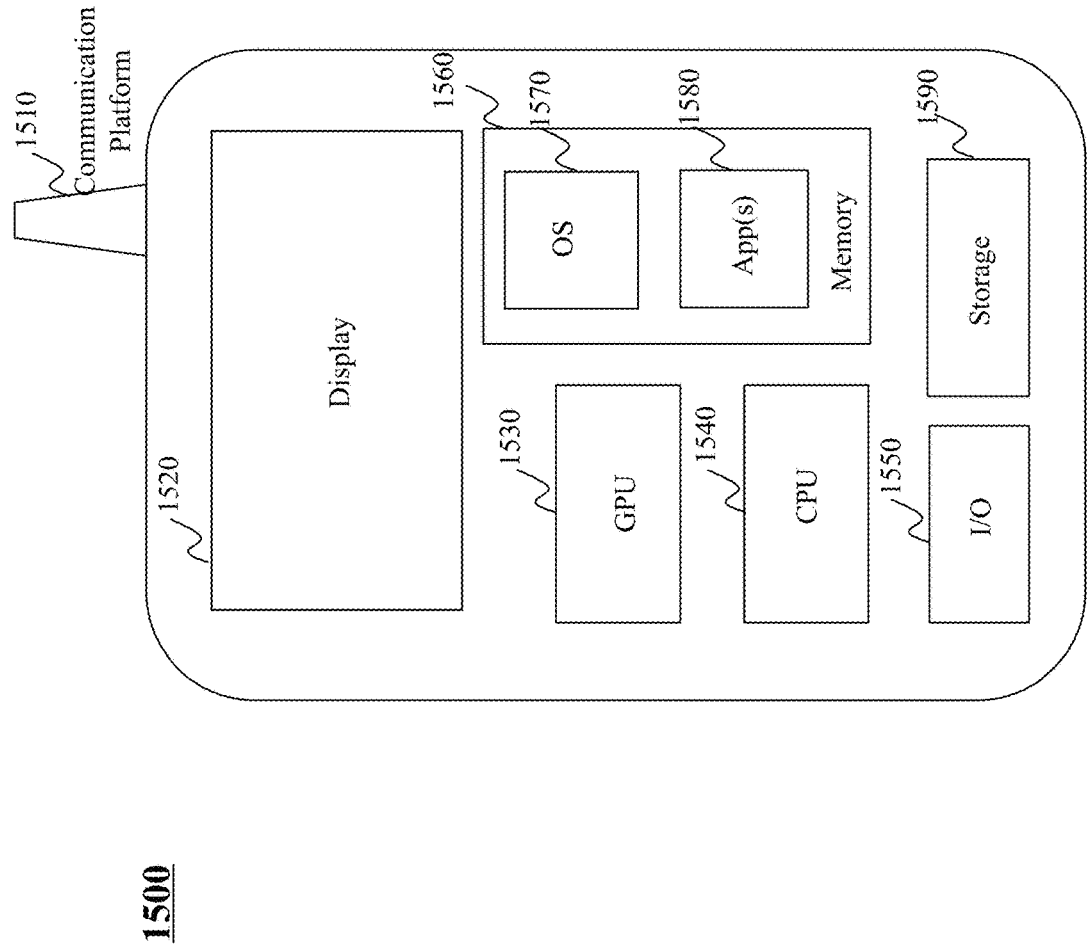
FIG. 15 depicts the architecture of a mobile device which can be used to implement a specialized system incorporating the present teaching.

FIG. 15 depicts the architecture of a mobile device which can be used to realize a specialized system implementing the present teaching. In this example, the user device on which a user interface for a dialog with a conversational agent is presented and interacted-with is a mobile device 1500, including, but is not limited to, a smart phone, a tablet, a music player, a handled gaming console, a global positioning system (GPS) receiver, and a wearable computing device (e.g., eyeglasses, wrist watch, etc.), or in any other form factor. The mobile device 1500 in this example includes one or more central processing units (CPUs) 1540, one or more graphic processing units (GPUs) 1530, a display 1520, a memory 1560, a communication platform 1510, such as a wireless communication module, storage 1590, and one or more input/output (I/O) devices 1550. Any other suitable component, including but not limited to a system bus or a controller (not shown), may also be included in the mobile device 1500. As shown in FIG. 15, a mobile operating system 1570, e.g., iOS, Android, Windows Phone, etc., and one or more applications 1580 may be loaded into the memory 1560 from the storage 1590 in order to be executed by the CPU 1540. The applications 1580 may include a browser or any other suitable mobile apps for receiving dialog responses from the conversational agent on the mobile device 1500. User interactions with the conversational agent may be achieved via the I/O devices 1550 and provided to the web-based conversational agent 140 and/or other components of systems 100 and 200, e.g., via the network 120.

To implement various modules, units, and their functionalities described in the present disclosure, computer hardware platforms may be used as the hardware platform(s) for one or more of the elements described herein (e.g., the web-based conversational agent 140, the web server 130 and/or other components of systems 100 and 200 described with respect to FIGS. 1-14). The hardware elements, operating systems and programming languages of such computers are conventional in nature, and it is presumed that those skilled in the art are adequately familiar therewith to adapt those technologies about facilitating a guided dialog between a user and a conversational agent as described herein. A computer with user interface elements may be used to implement a personal computer (PC) or other type of work station or terminal device, although a computer may also act as a server if appropriately programmed. It is believed that those skilled in the art are familiar with the structure, programming and general operation of such computer equipment and as a result the drawings should be self-explanatory.

Figure 16:
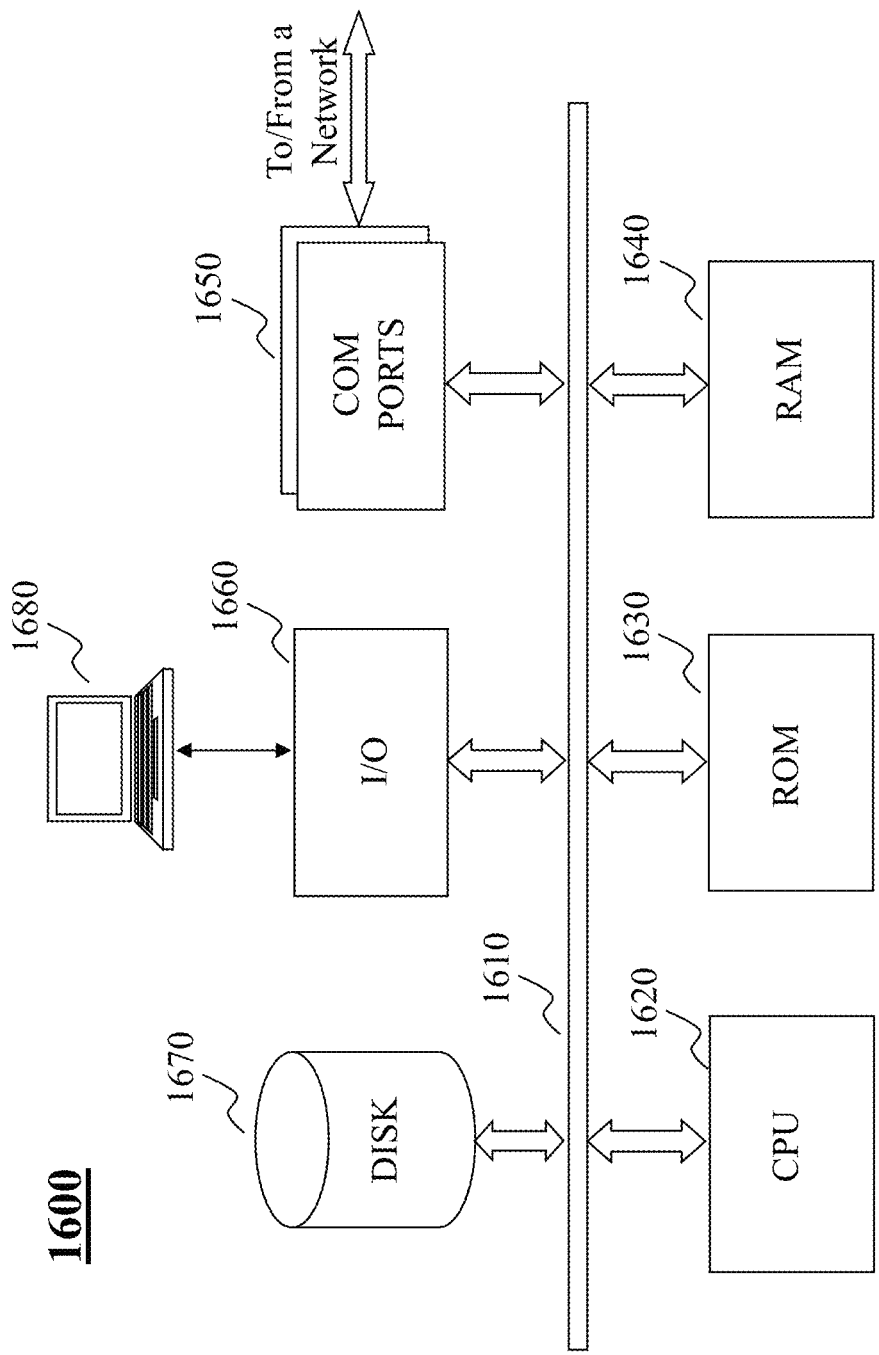
FIG. 16 depicts the architecture of a computer which can be used to implement a specialized system incorporating the present teaching.

FIG. 16 depicts the architecture of a computing device which can be used to realize a specialized system implementing the present teaching. Such a specialized system incorporating the present teaching has a functional block diagram illustration of a hardware platform which includes user interface elements. The computer may be a general purpose computer or a special purpose computer. Both can be used to implement a specialized system for the present teaching. This computer 1600 may be used to implement any component of the techniques of facilitating a guided dialog between a user and a conversational agent, as described herein. For example, the web server 130, the web-based conversational agent 140, etc., may be implemented on a computer such as computer 1600, via its hardware, software program, firmware, or a combination thereof. Although only one such computer is shown, for convenience, the computer functions relating to facilitating a guided dialog between a user and a conversational agent as described herein may be implemented in a distributed fashion on a number of similar platforms, to distribute the processing load.

The computer 1600, for example, includes COM ports 1650 connected to and from a network connected thereto to facilitate data communications. The computer 1600 also includes a central processing unit (CPU) 1620, in the form of one or more processors, for executing program instructions. The exemplary computer platform includes an internal communication bus 1610, program storage and data storage of different forms, e.g., disk 1670, read only memory (ROM) 1630, or random access memory (RAM) 1640, for various data files to be processed and/or communicated by the computer, as well as possibly program instructions to be executed by the CPU. The computer 1600 also includes an I/O component 1660, supporting input/output flows between the computer and other components therein such as user interface elements 1680. The computer 1600 may also receive programming and data via network communications.

Hence, aspects of the methods of facilitating a guided dialog between a user and a conversational agent, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer into the hardware platform(s) of a computing environment or other system implementing a computing environment or similar functionalities in connection with facilitating a guided dialog between a user and a conversational agent. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described above may be embodied in a hardware device, it may also be implemented as a software only solution—e.g., an installation on an existing server. In addition, facilitating a guided dialog between a user and a conversational agent as disclosed herein may be implemented as a firmware, firmware/software combination, firmware/hardware combination, or a hardware/firmware/software combination.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on a machine having at least one processor, storage, and a communication platform connected to a network for generating a task lineage associated with a dialog of a user, the method comprising:
   obtaining an input utterance from the user;
   determining one or more task sets estimated based on the input utterance, wherein each of the one or more task sets includes a plurality of tasks estimated to be requested by the user;
   computing a confidence score associated with each of the one or more tasks, wherein the confidence score is inversely proportional to a time interval between the input utterance and a last utterance by the user;
   selecting at least one of the one or more task sets based on their respective confidence scores;
   extracting one or more task lineages of the user from a task state database;
   generating one or more new task lineages based on the selected at least one task set;
   determining coherent features between the extracted one or more task lineages and the one or more new task lineages;
   extending each of the extracted one or more task lineages of the user based on a belief score estimated for each new task lineage; and
   providing the one or more task lineages to the user in response to the input utterance.

2. The method of claim 1, wherein the belief score is estimated for each new task lineage based on the coherent features and the confidence scores of the tasks in the selected at least one task set.

3. The method of claim 2, wherein determining one or more task sets further comprises:
   reassigning at least one of the plurality of dialog act items to a different task frame candidate to generate a second set of task frame candidates;
   determining a second task set that includes a plurality of tasks corresponding to the second set of task frame candidates;
   determining a task slot value for each of the plurality of dialog act items based on the reassignment with respect to the second set of task frame candidates; and
   calculating a second confidence score associated with the second task set.

4. The method of claim 1, wherein the confidence score is computed based on statistics with respect to the plurality of tasks in the task set.

5. The method of claim 1, further comprising:
   determining relevant context information based on the extracted one or more task lineages and the selected at least one task set;
   determining a context window representing a time period within which the relevant context information can be fetched;
   retrieving the relevant context information from a database based on the context window; and
   updating at least one task slot value of the sequence of tasks in the extracted one or more task lineages based on the retrieved relevant context information.

6. The method of claim 1, wherein determining one or more task sets comprises:
   determining a plurality of dialog act items based on a semantic analysis of the input utterance;
   assigning each of the plurality of dialog act items to a task frame candidate to generate a first set of task frame candidates, wherein at least one of the plurality of dialog act items is shared by two or more task frame candidates;
   determining a first task set that includes a plurality of tasks corresponding to the first set of task frame candidates;
   determining a task slot value for each of the plurality of dialog act items based on the assignment with respect to the first set of task frame candidates; and
   calculating a first confidence score associated with the first task set.

7. The method of claim 6, wherein the first confidence score is calculated based on one of the following statistics:
   the number of task frames in the first set of task frame candidates;
   the number of dialog act items assigned to each task frame candidate;
   the average number of dialog act items per active task frames in the first set of task frame candidates;
   the entropy of dialog act item distribution across the active task frames; and
   the number of active task frames with only one dialog act item.

8. A non-transitory machine-readable medium having information recorded thereon for generating a task lineage associated with a dialog of a user, wherein the information, when read by the machine, causes the machine to perform the following:
   obtaining an input utterance from the user;
   determining one or more task sets estimated based on the input utterance, wherein each of the one or more task sets includes a plurality of tasks estimated to be requested by the user;
   computing a confidence score associated with each of the one or more tasks, wherein the confidence score is inversely proportional to a time interval between the input utterance and a last utterance by the user;
   selecting at least one of the one or more task sets based on their respective confidence scores;
   extracting one or more task lineages of the user from a task state database;
   generating one or more new task lineages based on the selected at least one task set;
   determining coherent features between the extracted one or more task lineages and the one or more new task lineages;
   extending each of the extracted one or more task lineages of the user based on a belief score estimated for each new task lineage; and
   providing the one or more task lineages to the user in response to the input utterance.

9. The medium of claim 8, wherein the belief score is estimated for each new task lineage based on the coherent features and the confidence scores of the tasks in the selected at least one task set.

10. The medium of claim 9, wherein determining one or more task sets further comprises:
    reassigning at least one of the plurality of dialog act items to a different task frame candidate to generate a second set of task frame candidates;
    determining a second task set that includes a plurality of tasks corresponding to the second set of task frame candidates;
    determining a task slot value for each of the plurality of dialog act items based on the reassignment with respect to the second set of task frame candidates; and
    calculating a second confidence score associated with the second task set.

11. The medium of claim 8, wherein the confidence score is computed based on statistics with respect to the plurality of tasks in the task set.

12. The medium of claim 8, further comprising:
    determining relevant context information based on the extracted one or more task lineages and the selected at least one task set;
    determining a context window representing a time period within which the relevant context information can be fetched;
    retrieving the relevant context information from a database based on the context window; and
    updating at least one task slot value of the sequence of tasks in the extracted one or more task lineages based on the retrieved relevant context information.

13. The medium of claim 8, wherein determining one or more task sets comprises:
    determining a plurality of dialog act items based on a semantic analysis of the input utterance;
    assigning each of the plurality of dialog act items to a task frame candidate to generate a first set of task frame candidates, wherein at least one of the plurality of dialog act items is shared by two or more task frame candidates;
    determining a first task set that includes a plurality of tasks corresponding to the first set of task frame candidates;
    determining a task slot value for each of the plurality of dialog act items based on the assignment with respect to the first set of task frame candidates; and
    calculating a first confidence score associated with the first task set.

14. The medium of claim 13, wherein the first confidence score is calculated based on one of the following statistics:
    the number of task frames in the first set of task frame candidates;
    the number of dialog act items assigned to each task frame candidate;
    the average number of dialog act items per active task frames in the first set of task frame candidates;
    the entropy of dialog act item distribution across the active task frames; and
    the number of active task frames with only one dialog act item.

15. A system, having at least one processor, storage, and a communication platform connected to a network for generating a task lineage associated with a dialog of a user, comprising:

a semantic analyzer implemented by the at least one processor and configured for obtaining an input utterance from the user;

a task frame parser implemented by the at least one processor and configured for determining one or more task sets estimated based on the input utterance, wherein each of the one or more task sets includes a plurality of tasks estimated to be requested by the user, and computing a confidence score associated with each of the one or more tasks, wherein the confidence score is inversely proportional to a time interval between the input utterance and a last utterance by the user;

a dialog state updater implemented by the at least one processor and configured for selecting at least one of the one or more task sets based on their respective confidence scores;

a task lineage extractor implemented by the at least one processor and configured for extracting one or more task lineages of the user from a task state database;

a slot state updater implemented by the at least one processor and configured for generating one or more new task lineages based on the selected at least one task set;

a coherent feature determiner implemented by the at least one processor and configured for determining coherent features between the extracted one or more task lineages and the one or more new task lineages;

a task lineage extender implemented by the at least one processor and configured for extending each of the extracted one or more task lineages of the user based on a belief score estimated for each new task lineage; and a response generator implemented by the at least one processor and configured for providing the one or more task lineages to the user in response to the input utterance.

16. The system of claim 15, wherein the belief score is estimated for each new task lineage based on the coherent features and the confidence scores of the tasks in the selected at least one task set.

17. The system of claim 15, wherein the confidence score is computed based on statistics with respect to the plurality of tasks in the task set.

* * * * *